United States Patent
Kim et al.

(10) Patent No.: US 10,025,495 B2
(45) Date of Patent: Jul. 17, 2018

(54) MOBILE TERMINAL AND CONTROL METHOD TO CONVERT SCREEN INFORMATION IN RESPONSE TO CONTROL COMMAND

(71) Applicant: LG ELECTRONICS INC., Seoul (KR)

(72) Inventors: Minjoo Kim, Seoul (KR); Yongdeok Lee, Seoul (KR); Kwonhan Bae, Seoul (KR); Mijun Yoo, Seoul (KR); Jihye Min, Seoul (KR); Yeehyun Chung, Seoul (KR); Chulbae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 125 days.

(21) Appl. No.: 14/723,955

(22) Filed: May 28, 2015

(65) Prior Publication Data
US 2016/0018941 A1 Jan. 21, 2016

(30) Foreign Application Priority Data
Jul. 17, 2014 (KR) .................. 10-2014-0090606

(51) Int. Cl.
*G06F 3/033* (2013.01)
*G06F 3/0488* (2013.01)
*G06F 9/451* (2018.01)
*G06F 9/44* (2018.01)
*G06F 3/0482* (2013.01)
(Continued)

(52) U.S. Cl.
CPC ........ *G06F 3/04883* (2013.01); *G06F 3/0482* (2013.01); *G06F 3/0483* (2013.01); *G06F 3/04886* (2013.01); *G06F 9/4443* (2013.01); *G06F 9/44505* (2013.01); *G06F 9/451* (2018.02); *G06F 3/017* (2013.01); *G06F 2200/1636* (2013.01)

(58) Field of Classification Search
CPC .... G06F 3/0488; G06F 3/017; G06F 3/04883; G06F 3/04886; G06F 3/0483; G06F 3/0482; G06F 9/451; G06F 9/4443; G06F 9/44505
USPC ......................................... 715/863
See application file for complete search history.

(56) References Cited

U.S. PATENT DOCUMENTS

2008/0001924 A1* 1/2008 de los Reyes ...... G06F 3/04886
345/173
2009/0293007 A1* 11/2009 Duarte .................. G06F 3/0488
715/767
(Continued)

FOREIGN PATENT DOCUMENTS

CN 102662584 A * 9/2012 ............. G06F 3/041

*Primary Examiner* — Adam J Snyder
(74) *Attorney, Agent, or Firm* — KED & Associates LLP

(57) ABSTRACT

Disclosed is a mobile terminal which is capable of executing applications and a control method thereof. The mobile terminal includes a user input unit that receives setting of at least one mode and at least one application executable n each mode, a display unit that outputs first screen information corresponding to a first application executable in a selected first mode, and a controller that controls the display unit such that the first screen information is converted into second screen information corresponding to a second application executable in the first mode, in response to a control command for an application conversion which is input in the first mode.

18 Claims, 16 Drawing Sheets

(51) Int. Cl.
*G06F 9/445* (2018.01)
*G06F 3/0483* (2013.01)
*G06F 3/01* (2006.01)

(56) References Cited

U.S. PATENT DOCUMENTS

| | | | | |
|---|---|---|---|---|
| 2011/0252357 | A1* | 10/2011 | Chaudhri | G06F 3/0488 |
| | | | | 715/780 |
| 2011/0273388 | A1* | 11/2011 | Joo | G06F 3/0488 |
| | | | | 345/173 |
| 2012/0084710 | A1* | 4/2012 | Sirpal | G06F 3/04886 |
| | | | | 715/783 |
| 2012/0159395 | A1* | 6/2012 | Deutsch | G06F 3/0481 |
| | | | | 715/835 |
| 2013/0047105 | A1* | 2/2013 | Jarrett | G06F 3/04883 |
| | | | | 715/765 |
| 2013/0263054 | A1* | 10/2013 | Lee | G06F 3/04883 |
| | | | | 715/835 |
| 2013/0275909 | A1* | 10/2013 | Olomskiy | G06F 3/04886 |
| | | | | 715/781 |

* cited by examiner

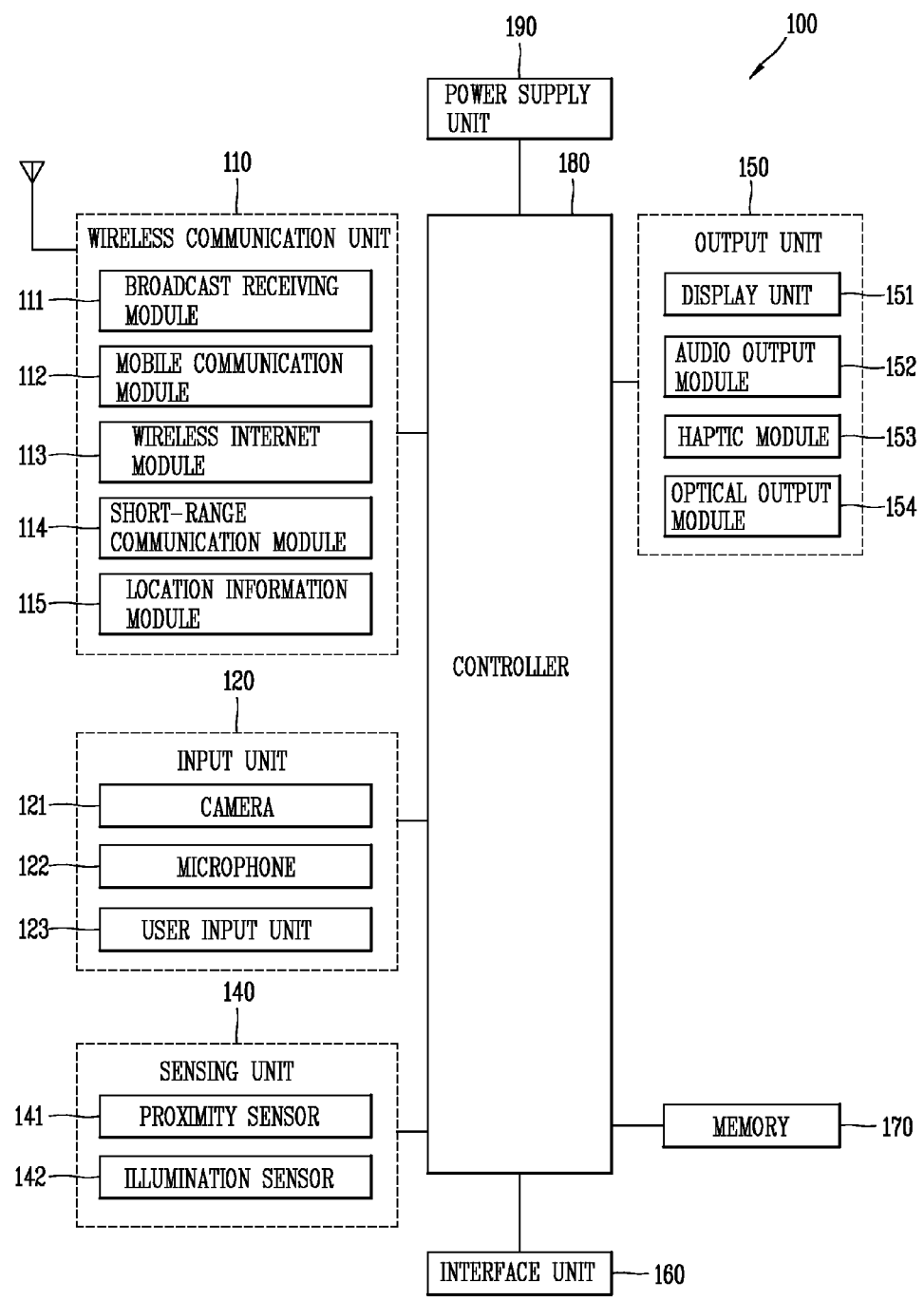

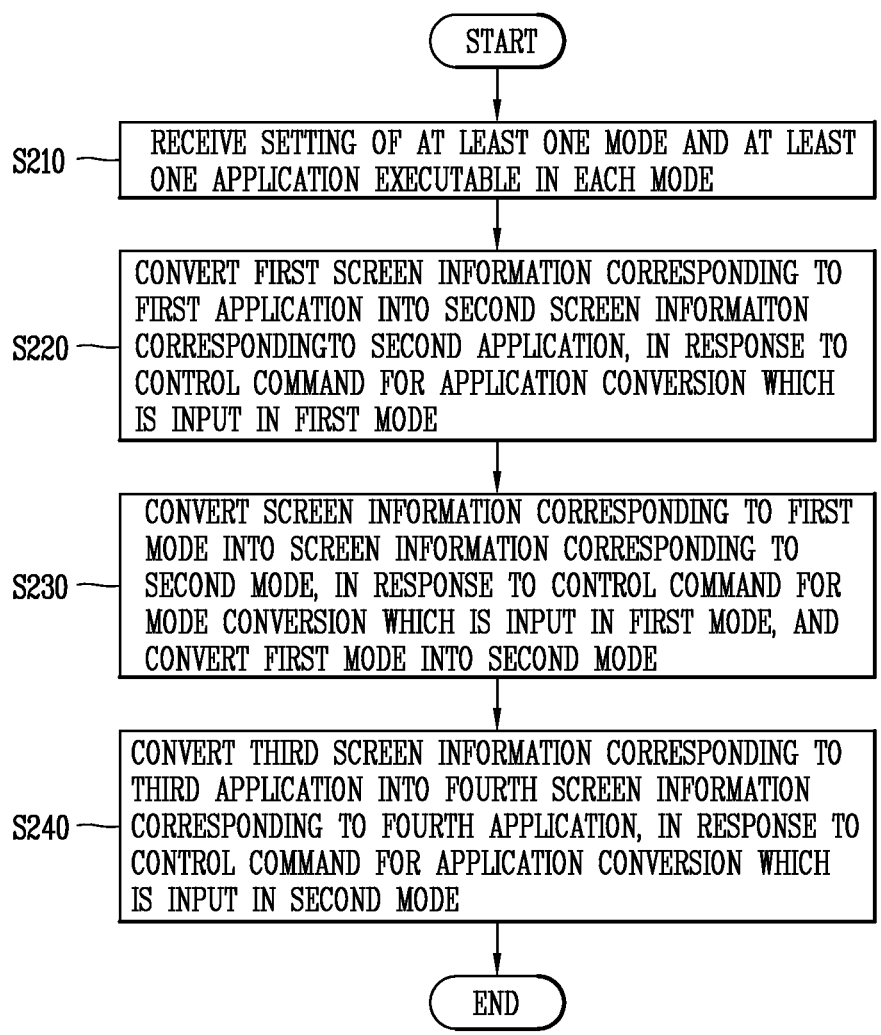

MOBILE TERMINAL AND CONTROL METHOD TO CONVERT SCREEN INFORMATION IN RESPONSE TO CONTROL COMMAND

CROSS-REFERENCE TO RELATED APPLICATION(S)

This application claims priority under 35 U.S.C. § 119 to Korean Application No. 10-2014-0090606 filed in Korea on Jul. 17, 2014, whose entire disclosure is hereby incorporated by reference.

BACKGROUND

1. Field

The present invention relates to a mobile terminal which is capable of executing an application and a method for controlling the same.

2. Background

A terminal is broadly categorized by mobility into a mobile (portable) terminal and a stationary terminal. The mobile terminal is further categorized by portability into a handheld terminal and a vehicle-mounted terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Thus, a variety of applications may be executed in the mobile terminal. However, there have been some problems in that several steps of screen conversion operations have to be performed when a second application which is different from a first application is to be executed during execution of the first application.

For instance, in order to execute a messenger application during execution of a mail application, it is required to turn off an execution screen of the mail application, return to a home screen and then touch an execution icon of a messenger application which is output to the home screen.

Thus it may be considered improving the aspect of the structure and/or software of the mobile terminal for increase and support of the function of the terminal.

The above references are incorporated by reference herein where appropriate for appropriate teachings of additional or alternative details, features and/or technical background.

SUMMARY OF THE INVENTION

It is an object of the present invention to provide a mobile terminal and a method for controlling the same, which is capable of solving the aforementioned problems of the conventional art.

It is another object of the present invention to provide a mobile terminal and a method for controlling the same, which is capable of converting a mode and an application without screen conversion of several steps.

To achieve objects of the present invention, there is provided a mobile terminal including: a user input unit configured to receive a setting of at least one mode and at least one application which is executable in each mode; a display unit configured to output first screen information corresponding to a first application which is executable in a selected first mode; and a controller configured to control the display unit such that the first screen information may be converted into second screen information corresponding to a second application which is executable in the first mode, in response to a control command for an application conversion which is input in the first mode, wherein the controller may be configured to control the display unit to convert the screen information corresponding to the first mode into screen information corresponding to a second mode, and the controller controls the display unit to convert the first mode into the second mode, in response to a control command for a mode conversion which is input in the first mode, and wherein the controller controls the display unit to convert third screen information corresponding to a third application which is executable in the second mode into fourth screen information corresponding to a fourth application which is executable in the second mode, in response to a control command for an application conversion which is input from the converted second mode.

In an embodiment of the present invention, the control command for an application conversion which is input in the first mode may correspond to at least one of a user's gesture to turn over a screen to a left or right direction, and a user's touch input applied to a left or right side of a bezel portion which encloses the display unit.

In an embodiment of the present invention, the user's gesture to turn over a screen to a left or right direction may include a user's left or right flicking input applied to the display unit.

In an embodiment of the present invention, the control command for a mode conversion which is input in the first mode may correspond to at least one of a user's gesture to turn over a screen to an upper or lower direction, and a user's touch input applied to an upper or lower end of a bezel portion which encloses the display unit.

In an embodiment of the present invention, the user's gesture to turn over a screen to an upper or lower direction may include a user's upper or lower flicking input applied to the display unit.

In an embodiment of the present invention, the controller may be configured to control the display unit to output an image effect which informs that a current application is in a convertible state into one of the at least one application which is executable in the first mode, in response to a control command for an application conversion which is input in the first mode.

In an embodiment of the present invention, the controller may be configured to control the display unit to output an image effect which informs that a current mode is in a convertible state into one of the at least one set mode, in response to a control command for a mode conversion which is input in the first mode.

In an embodiment of the present invention, the controller may be configured to control the display unit to convert the first screen information into a fifth screen information corresponding to a fifth application which is preset as an application related to the first application, in response to a control command for an application conversion which is input in the first mode.

In an embodiment of the present invention, the controller may be configured to control the display unit to convert the first screen information into a fifth screen information corresponding to a fifth application which has been executed for a preset time before or after execution of the first application, in response to a control command for an application conversion which is input in the first mode.

In an embodiment of the present invention, the controller may be configured to control the display unit to convert the first screen information into a fifth screen information corresponding to a fifth application, when a first icon for executing the first application and a fifth icon for executing the fifth application are output in the same group, in response to a control command for an application conversion which is input in the first mode.

Further, according to another aspect of the present invention, there is provided a method for controlling a mobile terminal including: (a) receiving a setting of at least one mode and at least one application which is executable in each mode; (b) converting first screen information corresponding to a first application which is executable in a first mode into second screen information corresponding to a second application which is executable in the first mode, in response to a control command for an application conversion which is input from the selected first mode; (c) converting screen information corresponding to the first mode to screen information corresponding to the second mode, and converting the first mode into the second mode, in response to a control command for an application conversion which is input in the first mode; and (d) converting third screen information corresponding to a third application which is executable in the second mode into fourth screen information corresponding to a fourth application which is executable in the second mode, in response to a control command for an application conversion which is input from the converted second mode.

In an embodiment of the present invention, the control command for an application conversion which is input in the first mode may correspond to at least one of the user's gesture to turn over a screen in the left or right and a user's touch input applied to left or right side of a bezel portion which encloses a display unit.

In an embodiment of the present invention, the user's gesture to turn over a screen to a left or right direction may include a user's left or right flicking input applied to the display unit.

In an embodiment of the present invention, the control command for a mode conversion which is input in the first mode may correspond to at least one of a user's gesture to turn over a screen to an upper or lower direction and a user's touch input applied to the upper or lower end of a bezel portion which encloses the display unit.

In an embodiment of the present invention, the user's gesture to turn over a screen in the upper or lower direction may include a user's upper or lower flicking input applied to the display unit.

In an embodiment of the present invention, the step (b) may include controlling the display unit to output an image effect which informs that a current application is in a convertible state into one of at least one application which is executable in the first mode, in response to a control command for an application conversion which is input in the first mode.

In an embodiment of the present invention, the step (c) may include controlling the display unit to output an image effect which informs that a current mode is in a convertible state into one of the at least one set mode, in response to a control command for a mode conversion which is input in the first mode.

In an embodiment of the present invention, the step (b) may include controlling the display unit to convert the first screen information into fifth screen information corresponding to a fifth application which is preset as an application related to the first application, in response to a control command for an application conversion which is input in the first mode.

In an embodiment of the present invention, the step (b) may include controlling the display unit to convert the first screen information into a fifth screen information corresponding to a fifth application which has been executed for a preset time before or after execution of the first application, in response to a control command for an application conversion which is input in the first mode.

In an embodiment of the present invention, the step (b) may include controlling the display unit to convert the first screen information into a fifth screen information corresponding to a fifth application, when a first icon for executing the first application and a fifth icon for executing the fifth application are output in the same group, in response to a control command for an application conversion which is input in the first mode.

BRIEF DESCRIPTION OF THE DRAWINGS

The embodiments will be described in detail with reference to the following drawings in which like reference numerals refer to like elements wherein:

FIG. 1A is a block diagram illustrating a mobile terminal according to an embodiment of the present invention;

FIG. 2 is a flowchart illustrating a control method of a mobile terminal according to an embodiment of the present invention;

DETAILED DESCRIPTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

A terminal in the present description may include a mobile terminal such as a portable phone, a smart phone, a notebook computer, a digital broadcasting terminal, Personal Digital Assistants (PDA), Portable Multimedia Player (PMP), a navigation system, a slate PC, a tablet PC, an ultra book, a wearable device (e.g., smart watch), a glass-type terminal (e.g., smart glass), a head mounted display (HMD), etc.

However, it will be obvious to those skilled in the art that the present invention may be also applicable to a fixed terminal such as a digital TV, a desktop computer and a digital signage, except for specific configurations for mobility.

Figure 1B:
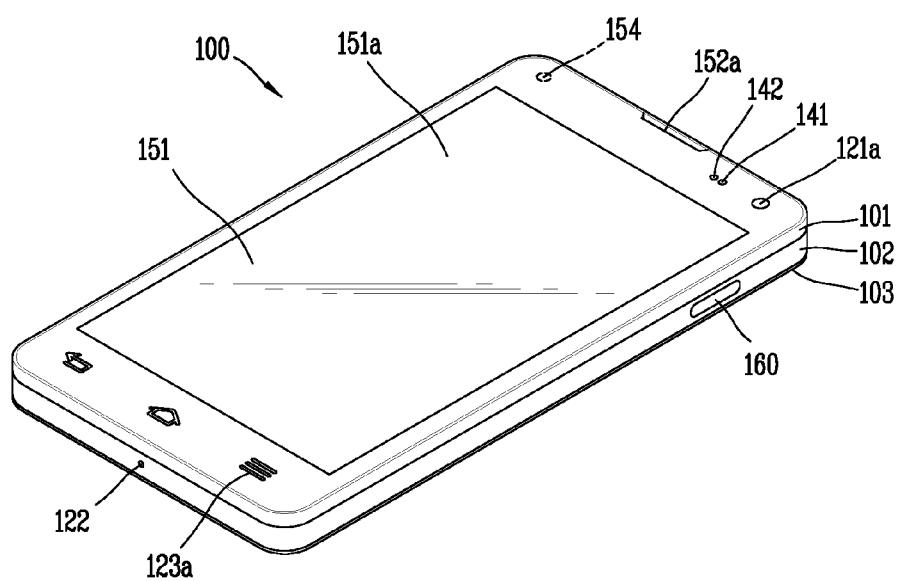
FIGS. 1B and 1C are schematic views illustrating a mobile terminal according to an embodiment of the present invention viewed from different directions.
Figure 1C:
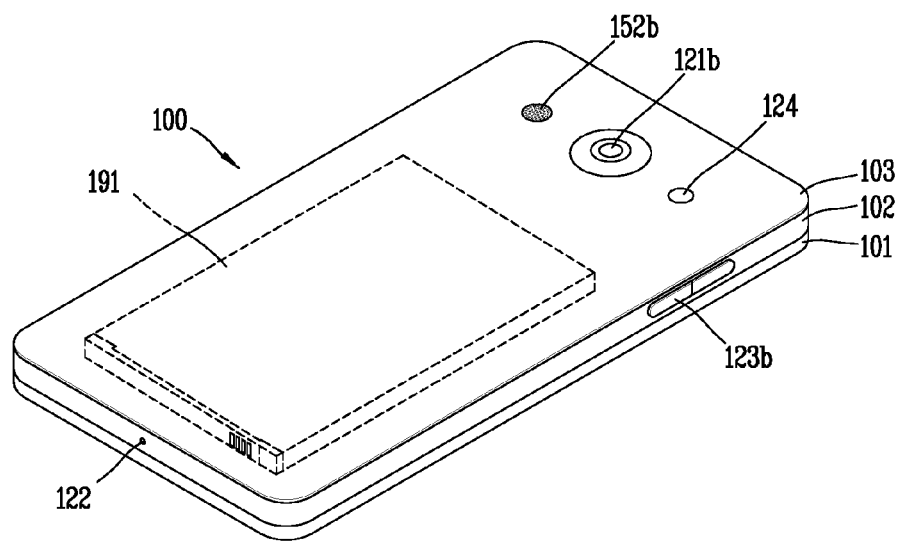

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components of FIG. 1A is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the components may operate in cooperation with one another in order to implement an operation, control or control method of the mobile terminal according to various exemplary embodiments to be described below. The operation, control or control method of the mobile terminal may be implemented on the mobile terminal by the execution of at least one application program stored in the memory 170.

Hereinafter, the aforementioned components will be explained in more detail with reference to FIG. 1A, before various embodiments are explained.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to the mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image is comprised of a left image (a left eye image) and a right image (a right eye image). According to how left and right images are combined into a 3D stereoscopic image, the 3D stereoscopic imaging method is divided into a top-down method in which left and right images are disposed up and down in a frame, an L-to-R (left-to-right, side by side) method in which left and right images are disposed left and right in a frame, a checker board method in which fragments of left and right images are disposed in a tile form, an interlaced method in which left and right images are alternately disposed by columns and rows, and a time sequential (or frame by frame) method in which left and right images are alternately displayed by time.

Also, as for a 3D thumbnail image, a left image thumbnail and a right image thumbnail are generated from a left image and a right image of the original image frame, respectively, and then combined to generate a single 3D thumbnail image. In general, thumbnail refers to a reduced image or a reduced still image. The thusly generated left image thumbnail and the right image thumbnail are displayed with a horizontal distance difference therebetween by a depth corresponding to the disparity between the left image and the right image on the screen, providing a stereoscopic space sense.

As illustrated, a left image and a right image required for implementing a 3D stereoscopic image is displayed on the stereoscopic display unit 152 by a stereoscopic processing unit (not shown). The stereoscopic processing unit may receive the 3D image and extract the left image and the right image, or may receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The display unit 151, the first audio output module 152a, the second audio output module 152b, the proximity sensor 141, the illumination sensor 142, the optical output module 154, a first camera 121a, a second camera 121b, the first manipulation unit 123a, the second manipulation unit 123b, the microphone 122, the interface 160, etc. may be provided at the mobile terminal 100.

As shown in FIGS. 1B and 1C, the display unit 151, the first audio output module 152a, the proximity sensor 141, the illumination sensor 142, the optical output module 154, the first camera 121a and the first manipulation unit 123a are arranged on a front surface of the terminal body. The second manipulation unit 123b, the microphone 122 and the interface 160 are arranged on side surfaces of the terminal body. And the second audio output module 152b and the second camera 121b are arranged on a rear surface of the terminal body.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable mobile terminals. Examples of such suitable mobile terminals include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two mobile terminals, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a receiver, and the second audio output module 152b may be implemented in the form of a loud speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may be implemented in a user's non-tactile manner, e.g., by a proximity touch, a hovering touch, etc.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (refer to FIG. 1A) may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

A method of controlling the mobile terminal with the configuration described above according to embodiments of the present invention is described below referring to the accompanying drawings. It is apparent to a person of ordinary skill in the art that modification, alteration, and improvement can be made to the present invention within a scope that does not depart from the nature and gist of the present invention.

FIG. 2 is a flowchart illustrating a control method of a mobile terminal according to an embodiment of the present invention.

As shown in FIG. 2, a step (210) to receive a setting of at least one mode and at least one application which is executable in each mode is proceeded.

Specifically, a mode may be defined by a specific state to use a mobile terminal 100, and a user may set one or more modes. Further, a user may set one or more applications which are executable in each of the one or more modes.

In an embodiment, a plurality of modes may be set by a place such as a school, a restaurant, home, and an office. Specifically, it is possible to set such that an office mail application may be executed in an office mode, and a music application may be executed in a home mode.

In another embodiment, it may be possible to set a plurality of modes by circumstances such as a travel, a testing period, business, and leisure. Specifically, it may be possible to set such that a road guide application or a map application may be executed in a travel mode, and an English dictionary application may be executed in a testing period mode.

Consecutively, a step (S220) to convert a first screen information corresponding to a first application which is executable in a first mode into a second screen information corresponding to a second application which is executable in the first mode, in response to a control command which is input in the selected first mode, may proceed.

Specifically, a control command for an application conversion may be defined by a command to convert screen information corresponding to an application which is being output to a screen 151 in a current mode into screen information corresponding to other application, and may be input to a user input unit 123 in various types.

Further, screen information corresponding to an application means a screen which is output to a display unit 151 during execution or preparing for execution of an application.

In an embodiment, when a user applies a continuous flicking input to the left or right to the screen 151, screen information corresponding to applications which are executable in the current mode may be output while being turned over page by page to the left or right side.

Next, a step (S230) to convert screen information corresponding to the first mode into screen information corresponding to the second mode, in response to a control command for a mode conversion which is input in the first mode, and then to convert the first mode into the second mode, may proceed.

Specifically, the control command for a mode conversion may be defined by a command to convert screen information being output to the screen 151 corresponding to a current mode into screen information corresponding to the other mode, and thus to convert a mode of the mobile terminal 100 together. Further, the control command for a mode conversion may be input through the user input unit 123 in various types.

Here, the screen information corresponding to a specific mode is a screen which indicates that a current state of the mobile terminal 100 is a specific mode, and may be set as one screen information among applications which are executable in a specific mode, or a new screen indicating a specific mode.

In an embodiment, when a user applies a continuous flicking input in an upper or lower direction to the screen 151, screen information indicating each mode such as a travel mode, a home mode, and an office mode may be output while being turned over page by page in an upper or lower direction. Further, as the screen information indicating the mode is output differently, the mode of the mobile terminal 100 may be converted.

Thereafter, a step (240) to convert a third screen information corresponding to a third application which is executable in the second mode into a fourth screen information corresponding to a fourth application which is executable in the second mode, in response to a control command for an application which is input in the second mode, may proceed.

As described above, the control command for an application conversion may be defined by a command to convert screen information corresponding to an application which is being output to the screen 151 in the converted mode into screen information corresponding to other application, and may be input through the user input unit 123 in various formats.

In an embodiment, when a user applies a continuous flicking input in the left or right direction to the screen 151, screen information corresponding to applications which are executable in the converted mode may be output while being turned over to the left or right page by page.

Meanwhile, in an embodiment, the first application and the second application which are executable in the first mode may be set as different applications from each other. Thus, the first screen information and the second screen information may be output as different images from each other.

Similarly, the third application and the fourth application executable in the second mode which is different from the first mode may be set as different images from each other. Thus, the third screen information and the fourth screen information may be output as different images from each other.

Further, applications which are executable in the first mode and applications which are executable in the second mode may be overlapped with each other. For instance, the same mail application may be executed in the office mode and the home mode, respectively.

Meanwhile, the user input unit 123 may receive a setting of at least one mode and at least one application which is executable in each mode.

Figure 3A:
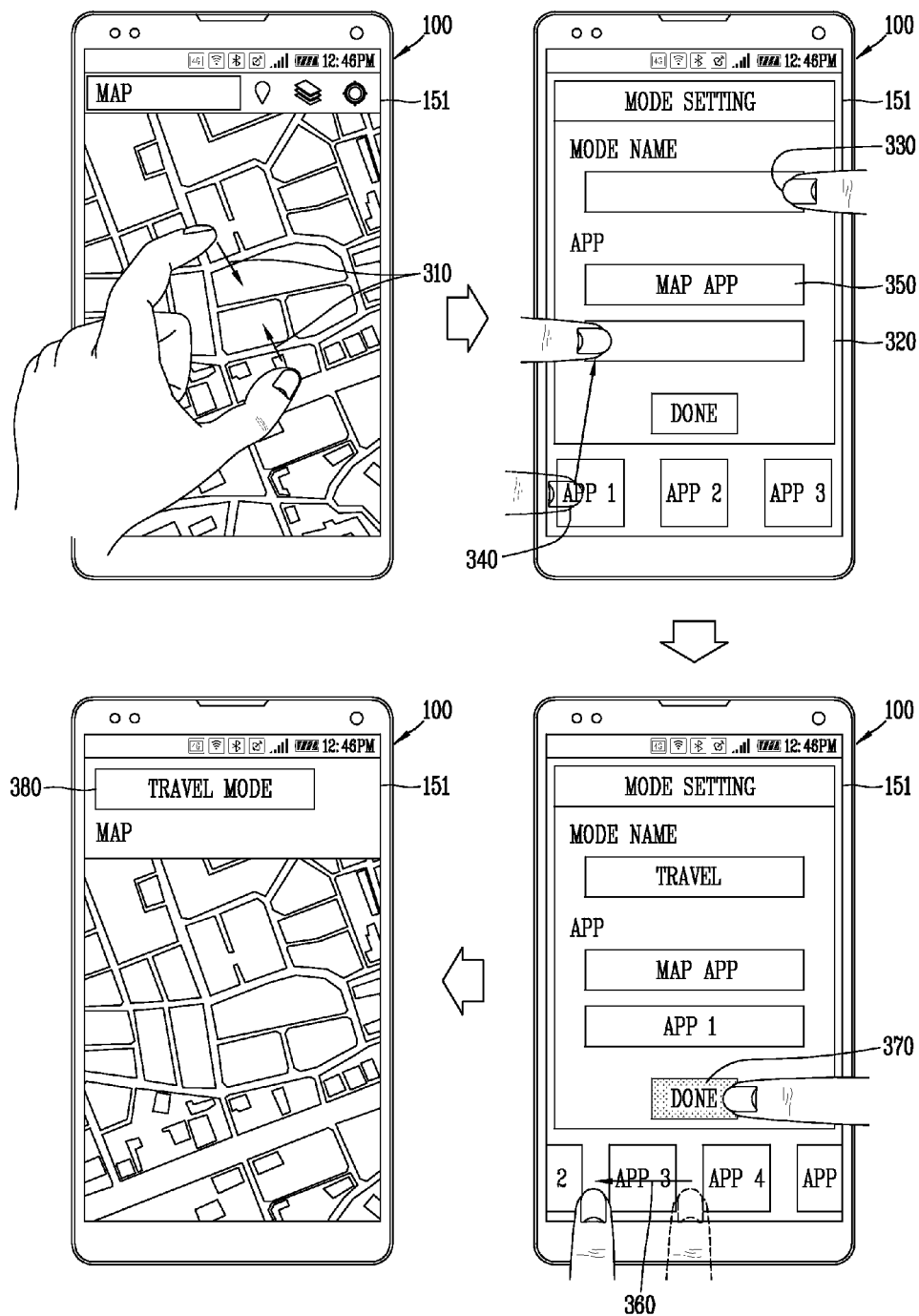
FIGS. 3A and 3B are schematic views illustrating examples of a user interface to set a mode and select an application executable in the mode.
Figure 3B:
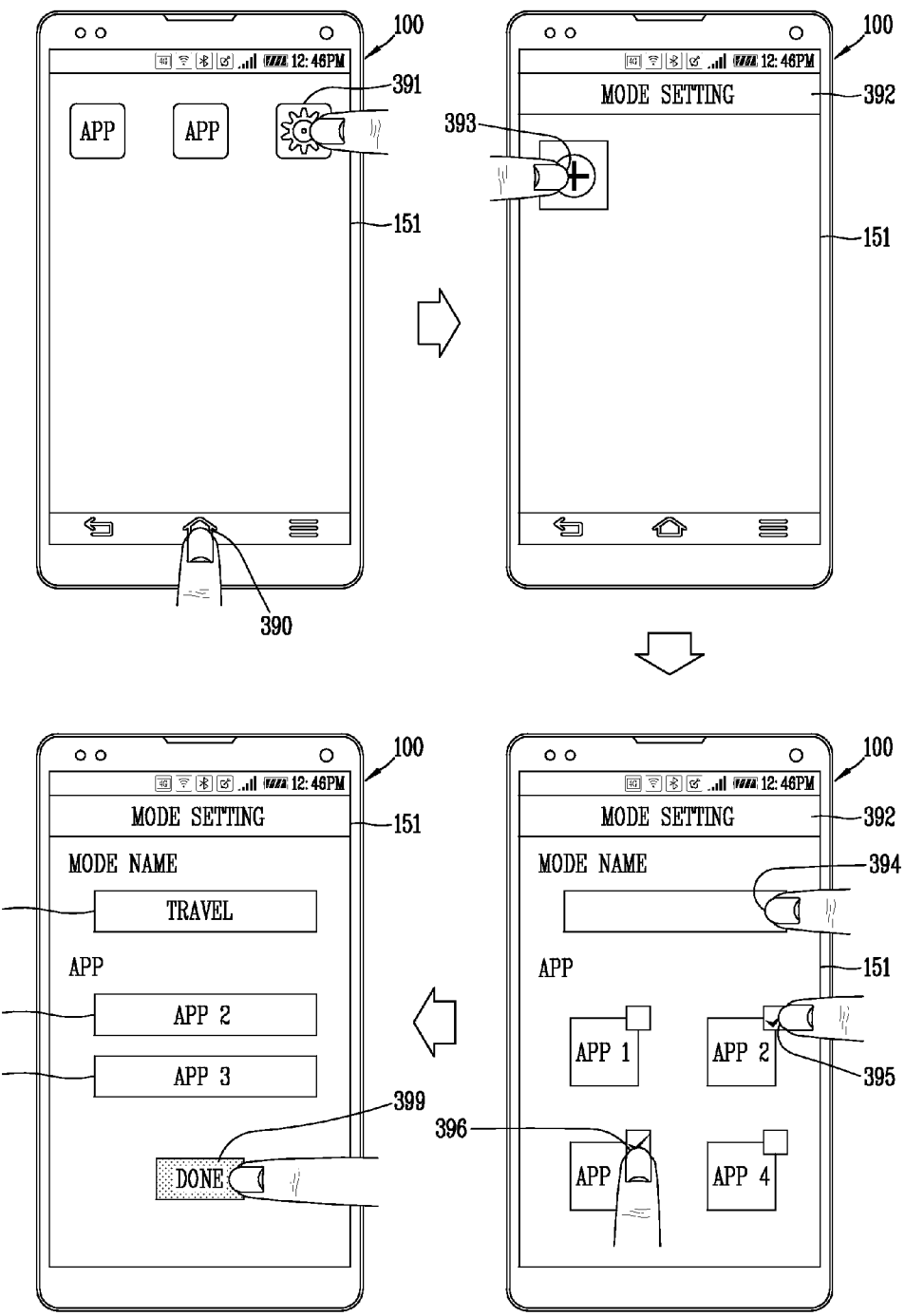

FIGS. 3A and 3B are views illustrating embodiments of a user interface to set a mode and an application which is executable in the mode.

Referring to FIG. 3A, a user may apply a pinch-in input (310) to the screen 151 during execution of a map application.

Referring to the second drawing of FIG. 3A, according to the pinch-in input (310) as shown in the first drawing of FIG. 3A, a screen (320) through which a mode can be set may be output. Thereafter, a user may touch and select a mode name input window (330) and then input a name of a mode.

Further, a map application which has been previously executed by a user may be set as an application which is executable in the mode to be set. Thus, a title (350) of a map application may be output in a list of applications which are executable in the mode to be set.

In this case, in order to add applications which are executable in the mode to be set, a user may touch one (340) of a plurality of application icons which are output to a lower end of the display unit 151, and then drags toward a mode setting screen (320) or a list of applications which are executable in the mode to be set.

Referring to the third drawing of FIG. 3A, a user may search an icon of an application to be added by applying a left or right flicking input to a lower end of the display unit 151. Then, it is possible to add as applications to be executable in the mode to be set by dragging an icon of an application to be added in the format as shown in the second drawing of FIG. 3A.

Further, a user may touch and select a mode setting completion icon (370) in order to complete a mode setting operation.

Referring to the fourth drawing of FIG. 3A, after completion of the mode setting, a map application which has previously been executed may be output again. In this case, the current mode of the mobile terminal 100 may be automatically set to a travel mode, and an icon (380) which indicates such a mode of the mobile terminal 100 may be output to the display unit 151.

In another embodiment to set a mode and an application executable in the set mode, referring to the first drawing of FIG. 3B, a user may press a home button (390) long or short, or apply a long touch or a short touch to a mode setting icon (391).

Referring to the second drawing of FIG. 3B, according to the user input of the first drawing of FIG. 3B, a mode setting screen (392) may be output. Subsequently, a user may touch and select an icon (393) corresponding to a control command for a mode creation.

Referring to the third drawing of FIG. 3B, according to selection of the icon (393) in the second drawing of FIG. 3B, a mode name input window (394) and a screen to select an application may be output to the mode setting screen (392).

Thus, a user may input a name of a mode after touching and selecting the mode name input window (394). Further, it is possible to touch and select check boxes (395 and 396) of an icon corresponding to the application.

Specifically, when a user touches the check box (395) of an icon corresponding to the second application, a check sign is output to the check box (395) and the second application may be designated as an application which is executable in the mode to be set.

Similarly, when a user touches the check box (396) of an icon corresponding to the third application, a check sign is output to the check box (396) and the third application may be designated as an application which is executable in the mode to be set.

Referring to the fourth drawing of FIG. 3B, a title (397) of the second application and a title (398) of the third application may be output to a list of the applications which are executable in the mode to be set.

Further, in order to complete a mode setting operation, a user may touch and select a mode setting completion icon (399).

Meanwhile, a control command for an application conversion which is input in the first mode may correspond to one of user's screen turn-over gestures in the left or right direction and a user's touch inputs applied to a left or right side of a bezel portion which encloses the display unit 151.

In this case, the user's screen turn-over gesture in the left or right direction may include a user's left or right flicking input applied to the display unit 151.

Further, the controller 180 may control the display unit 151 to output an image effect indicating that it is a state that a current mode may be convertible into at least one application which is executable in the first mode, in response to a control command for an application conversion which is input in the first mode.

FIG. 4A through 4D are schematic views illustrating examples of a user interface to convert an application in the selected mode.

In an embodiment, FIG. 4A through 4D assume a travel mode in which a map application, a camera application, and a phone application are executable.

Figure 4A:
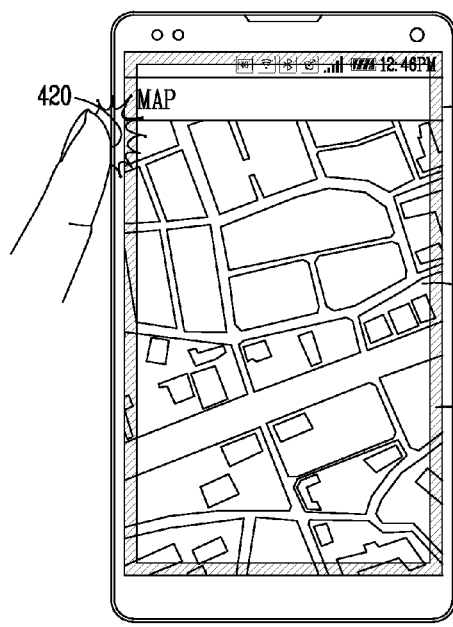
FIG. 4A through 4D are schematic views illustrating examples of a user interface to convert an application in a selected mode.

Referring to FIG. 4A, an execution screen (410) of a map application may be output by a user in a travel mode.

Consecutively, a user may input a tapping input to a left side (420) of the bezel portion which encloses the display unit 151. For instance, a user may apply an input by tapping lightly twice the left side (420) of the bezel portion.

Thus, it is possible to enter into a state that the applications which are executable in the travel mode may be convertible. Further, as an effect to indicate such a state, one region (430) where the display unit 151 and the bezel portion are adjacent to each other may be output more bright than other region.

In another embodiment, a flickering image effect may be output to the one region (430) where the display unit 151 and the bezel portion are adjacent to each other.

Figure 4B:
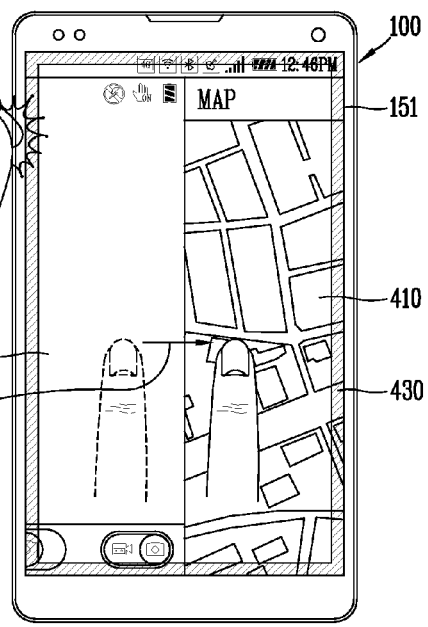

Referring to FIG. 4B, a user may apply a tapping input to a left portion (420) of the bezel portion which encloses the display unit 151, or take a gesture that seems to turn over a screen 151 to the left or right. For instance, a user may apply a flicking input (440) to the display unit 151 to the right.

In an embodiment, an execution screen (410) of a map application may move to the right following a user's finger which applies a flicking input (440). As a result, an execution screen (450) of a camera application may be output following the user's finger in a form that seems to push out the execution screen (410) of a map application.

Figure 4D:
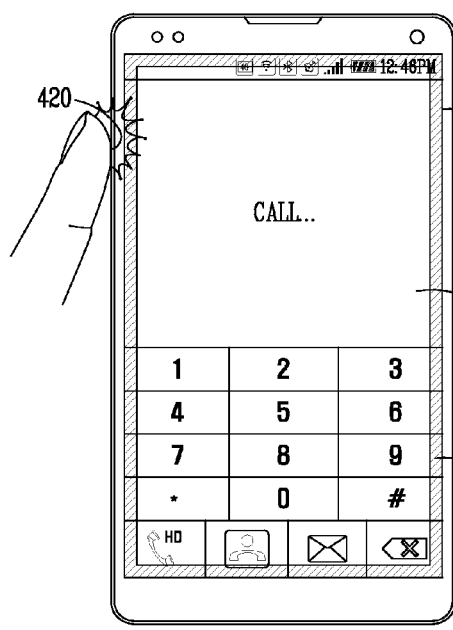
Figure 4C:
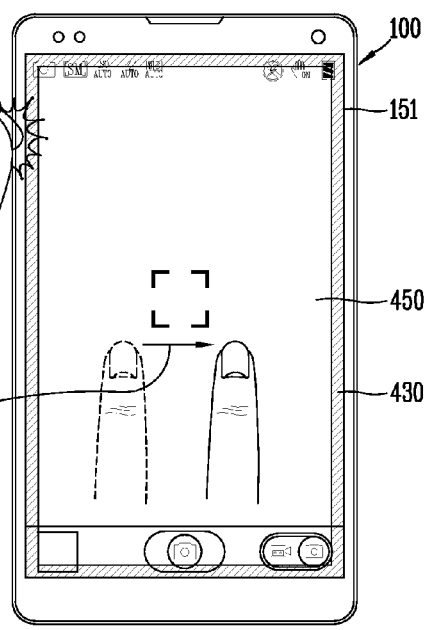

Referring to FIG. 4C, the execution (410) of a map application may be converted into the execution screen (450) of a camera application according to the user input of FIG. 4B.

As described above, a user may apply a tapping input to the left side (420) of the bezel portion which encloses the display unit 151 or take a gesture that seems to turn over a screen 151 to the left or right in a state where the screen is converted into the execution screen (450) of a camera application. For instance, a user may apply a flicking input (440) to the display unit 151 to the right.

In a further embodiment, a user may take a gesture that seems to turn over a screen 151 in the left or right with the palm of his or her hand opened without touching the screen 151.

Referring to FIG. 4D, the execution screen (450) of a camera application may be converted into an execution screen (460) of a phone application according to the user input of FIG. 4C.

Like in the aforementioned embodiment (refer to FIG. 4B), the execution screen (450) of a camera application may move to the right following a user's finger which applies a flicking input (440). As a result, an execution screen (460) of a phone application may be output following the user's finger in a form that seems to push out the execution screen (450) of a camera application.

Further, a user may release the state that applications executable in the travel mode may be convertible, by applying a tapping input to the left side (420) of the bezel portion which encloses the display unit 151. As a result, the image effect which has been outputting brightly to the one region (430) where the display unit 151 and the bezel portion are adjacent to each other may disappear.

In a further embodiment, when a control command for an application conversion is not input for a preset time, a state that executable applications are convertible may be released. Similarly, in this case, the image effect which has been outputting brightly to the one region (430) where the display unit 151 and the bezel portion are adjacent to each other may disappear.

Meanwhile, the control command for a mode conversion which is input in the first mode may correspond to one of the user's screen turn-over gesture in the upper or lower direction and the user's touch input applied to an upper end or lower end of the bezel portion which encloses the display unit 151.

Here, the user's upper or lower screen turn-over gesture may include a user's upper or lower flicking input applied to the display unit 151.

Further, the controller 180 may control the display unit 151 to output an image effect indicating that it is a state that a current mode may be convertible to one of the at least one set mode, in response to a control command for a mode conversion which is input in the first mode.

FIG. 5A through 5D are schematic views illustrating examples of the user interface to convert a mode.

In an embodiment, in FIG. 5A through 5D, it is assumed that a mode is converted from a travel mode in which a map application, a camera application, and a phone application are executable to a working mode in which an email application is executable and a resting mode in which a music application and a movie application are executable.

Figure 5A:
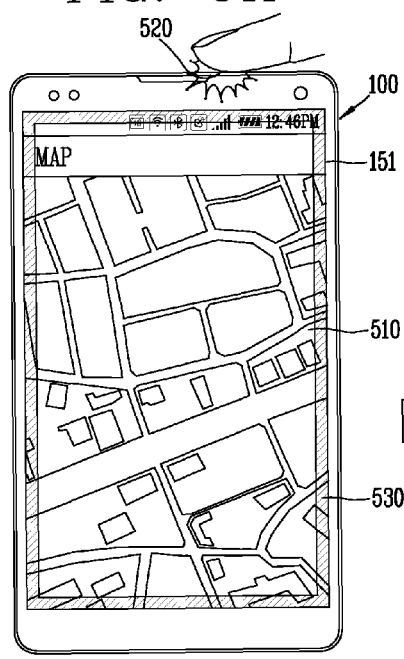
FIG. 5A through 5D are schematic views illustrating examples of a user interface to convert a mode.

Referring to FIG. 5A, an execution screen (510) of a map application may be output in the travel mode by a user's intention.

Thereafter, a user may apply a tapping input to an upper end (520) of the bezel portion which encloses the display unit 151. For instance, a user may apply an input to the upper end (520) of the bezel portion by slightly tapping twice. As a result, it is possible to enter into a state that may convert a travel mode into another mode. Further, as an effect to indicate such a state, one region (530) where the display unit 151 and the bezel portion are adjacent to each other may be output more bright than other region.

In a further embodiment, a flickering image effect may be output to the one region (530) where the display unit 151 and the bezel portion are adjacent to each other.

Figure 5B:
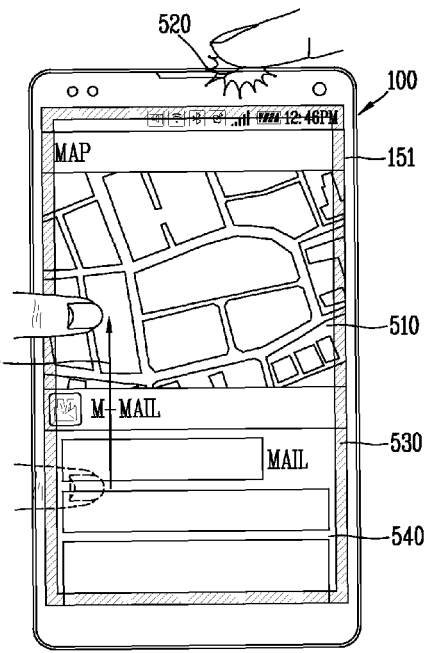

Referring to FIG. 5B, a user may input a tapping input to an upper end (520) of the bezel portion which encloses the display unit 151, or take a gesture that seems to turn over a screen 151 in the upper or lower direction. For instance, a user may apply an upper flicking input (550) to the display unit 151.

In an embodiment, an execution screen (510) of a map application may move to the upper direction following a user's finger which applies a flicking input (550). As a result, an execution screen (540) of a mail application which is executable in the converted working mode may be output following the user's finger in a form that seems to push out the execution screen (510) of a map application.

In a further embodiment, a new screen corresponding to the converted working mode may be output. Specifically, a new screen including a name of a mode or a list of executable applications may be output following a user' finger in a form that seems to push out the execution screen (510) of a map application.

Figure 5D:
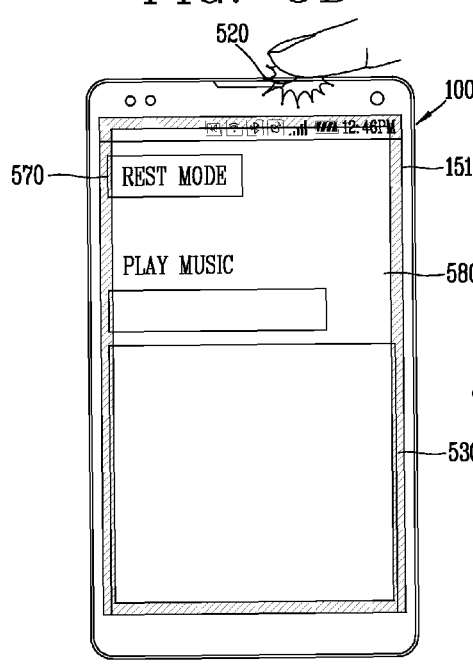
Figure 5C:
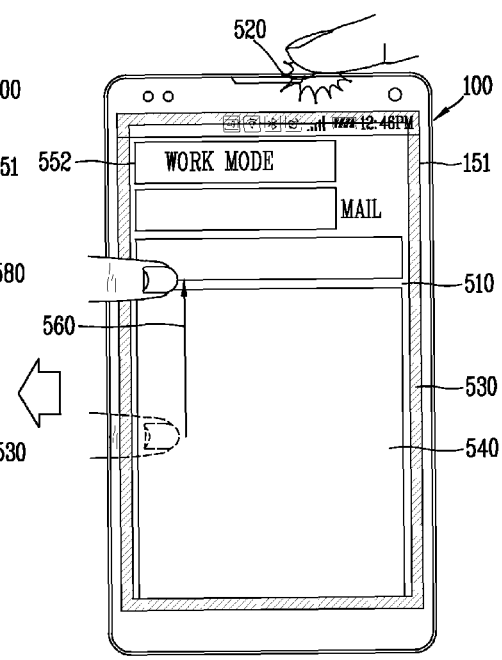

Referring to FIG. 5C, the execution screen (510) of a map application may be converted into a new screen corresponding to a working mode or the execution screen (540) of a mail application according to the user input of FIG. 5B.

Further, together with such a conversion of screen, a mode of the mobile terminal 100 is converted from a travel mode into a working mode. In this case, an icon (552) indicating that the current mode of the mobile terminal 100 is a working mode may be output temporarily or until the mode is newly converted.

As described above, a user may apply a tapping input to the upper end (520) of the bezel portion which encloses the display unit 151 or take a gesture that seems to turn over a screen 151 in the upper or lower direction in a state where the screen is converted into the execution screen (540) of a mail application which is executable in the working mode. For instance, a user may apply an upper flicking input (440) to the display unit 151.

In a further embodiment, a user may take a gesture that seems to turn over a screen 151 in the upper or lower direction with the palm of his or her hand opened without touching the screen 151.

Referring to FIG. 5D, the execution screen (510) of a mail application may be converted into a new screen corresponding to a resting mode or an execution screen (580) of one of applications which are executable in the resting mode according to the user input of FIG. 5C.

Further, together with such a conversion of screen, a mode of the mobile terminal 100 is converted from a working mode into a resting mode. In this case, an icon (570) indicating that the current mode of the mobile terminal 100 is a resting mode may be output temporarily or until the mode is newly converted.

Meanwhile, in a case where the application which is executable in a specific mode is plural, an execution screen of one application selected based on a preset reference may be output simultaneously with conversion into a specific mode.

That is, as assumed above, in a case where an application which is executable in the resting mode is plural as a music application and a movie application, an execution screen (580) of a music application of which the order of priority has previously been set by a user may be output simultaneously with conversion into a resting mode.

In a further embodiment, an execution screen of an application which has recently been set as an application executable in a specific mode by a user may be output simultaneously with conversion into a specific mode.

Specifically, a user may designate a music application as an application executable in the resting mode, after designating a movie application as an application executable in the resting mode. As a result, an execution screen (580) of a music application which has recently been set as an application executable in the resting mode may be output simultaneously with conversion into a resting mode.

Like in the aforementioned embodiment (refer to FIG. 5B), an execution screen (540) of a mail application may move upward along a user's finger which applies a flicking input (560). As a result, an execution screen (580) of a music application may be output along a user's finger in a form that seems to push out the execution screen (540) of a music application.

In a further embodiment, a new screen corresponding to the converted resting mode may be output. Specifically, a new screen including a name of a mode or a list of executable applications may be output following a user's finger in a form that seems to push out the execution screen (540) of a mail application.

Further, a user may release the state that a mode may be convertible, by applying a tapping input to the upper end (520) of the bezel portion which encloses the display unit 151. As a result, the image effect which has been outputting brightly to the one region (530) where the display unit 151 and the bezel portion are adjacent to each other may disappear.

In a further embodiment, when a control command for a mode conversion is not input for a preset time, a state that a mode is convertible may be released. Similarly, in this case, the image effect which has been outputting brightly to the one region (530) where the display unit 151 and the bezel portion are adjacent to each other may disappear.

Meanwhile, the controller 180 may control the display unit 151 to convert the first screen information into a fifth screen information corresponding to a fifth application which is preset as an application related to the first application, in response to a control command for an application conversion which is input in the first mode.

Figure 6A:
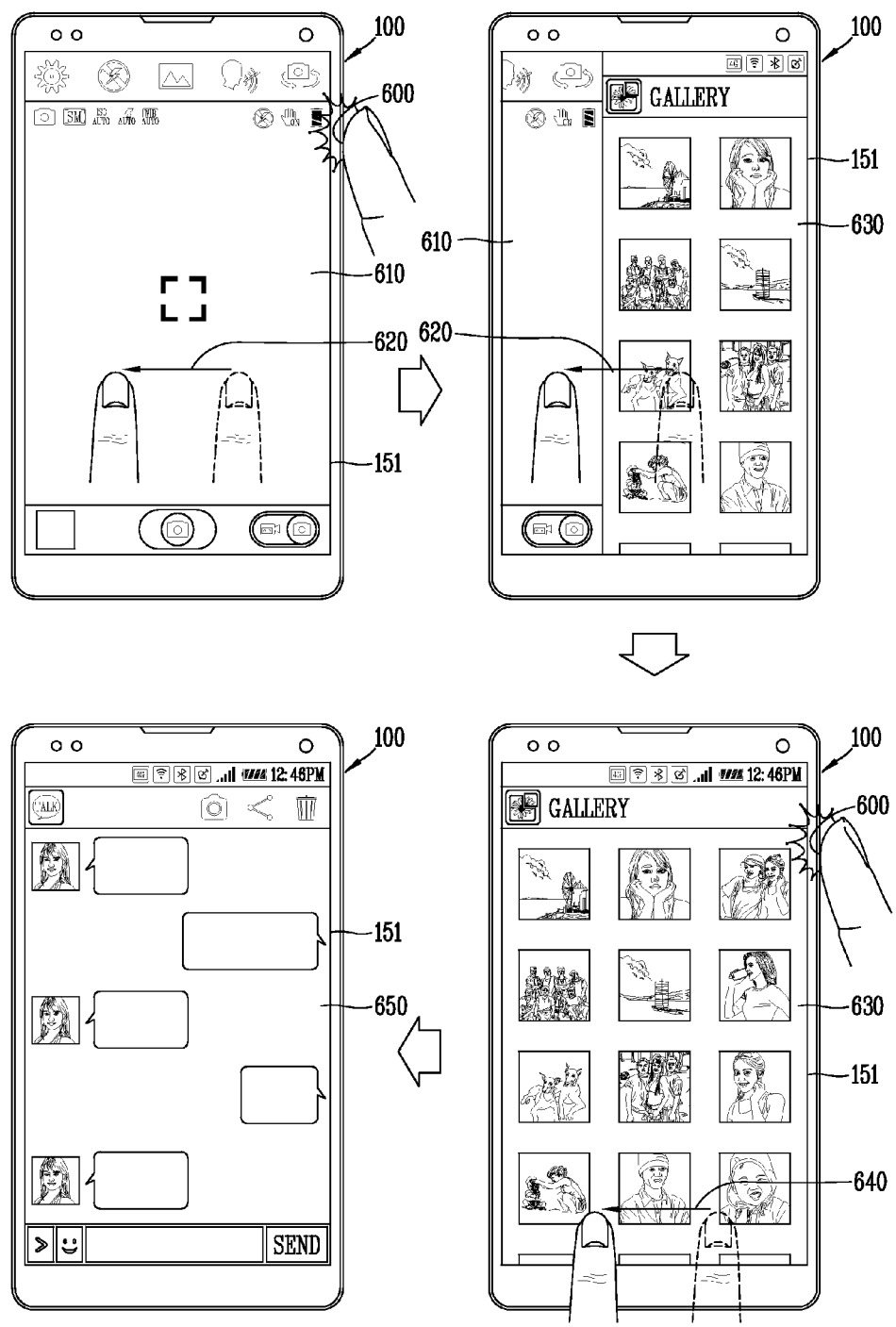
FIGS. 6A and 6B are schematic views illustrating examples of a user interface to convert a current application into a related application.
Figure 6B:
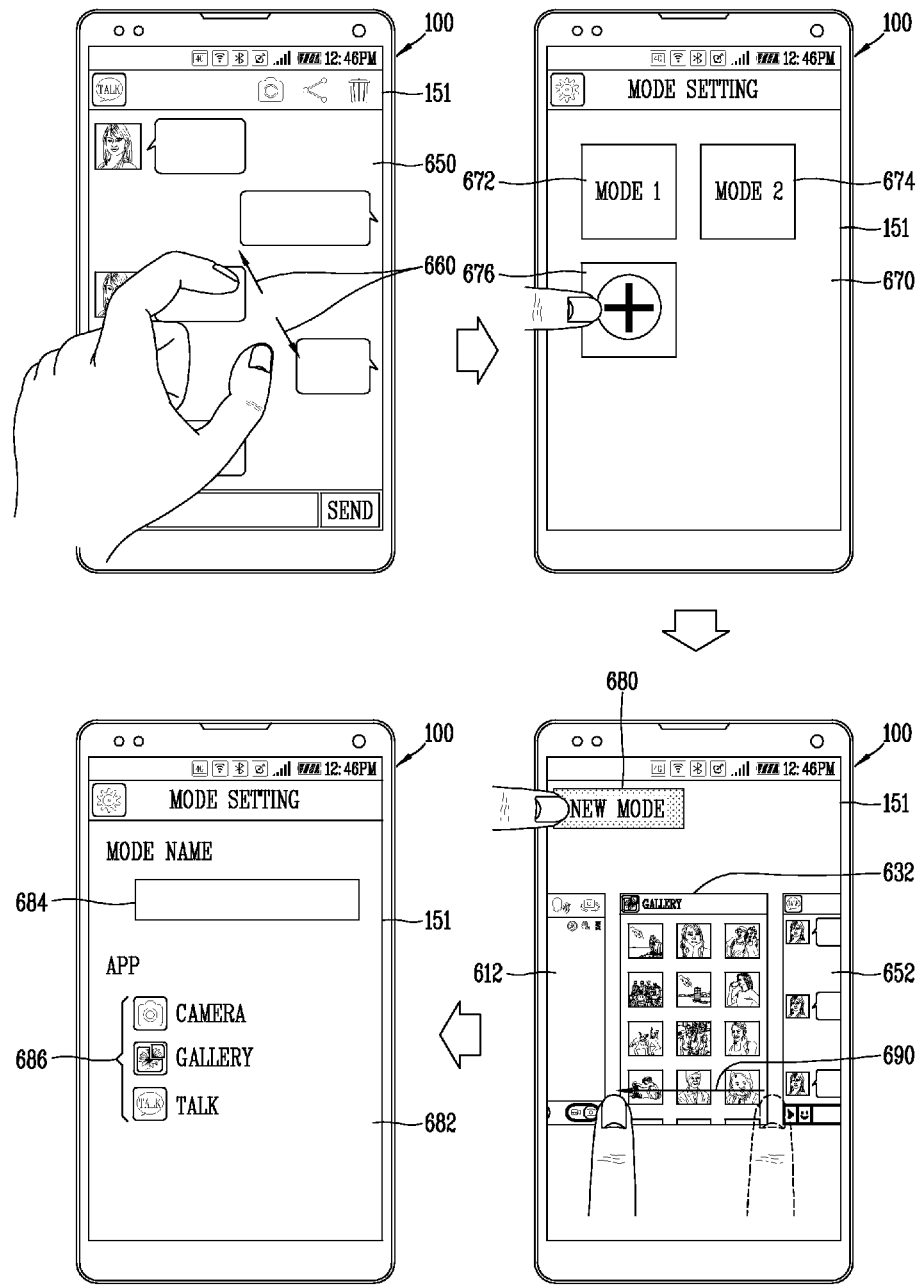

FIGS. 6A and 6B are schematic views illustrating examples of a user interface which is converted into a related application.

Referring to FIG. 6A, an execution screen (610) of a camera application may be output in a specific mode by a user.

Alternatively, the execution screen (610) of a camera application may be output in a state that a specific mode is not set to the mobile terminal 100. For instance, the execution screen may be output before a mode is generated, or when the execution screen 610 may be output, a camera application is executed on a home screen before a mode of the mobile terminal 100 is set.

Thereafter, a user may apply a tapping input to a right side (600) of the bezel portion which encloses the display unit 151. Specifically, a user may tap twice on the right side (600) of the bezel portion.

In a further embodiment, a user may apply a flicking input (620) to the left side to an execution screen (610) of a camera application.

In a further embodiment, a user may take a gesture that seems to turn over a screen 151 to the left with the palm of his or her hand opened without touching the screen 151.

Referring to the second drawing of FIG. 6A, the execution screen (610) of a camera application may move to the left following a user's finger which applies a flicking input (620). As a result, an execution screen (630) of a photo album may be output following a user's finger in a form that seems to push out the execution screen (610) of a camera application.

In a further embodiment, the execution screen (630) of a photo album may be output in a form that seems to push out the execution screen (610) of a camera application, following a user's hand motion that seems to turn over a screen 151 to the left without touching the screen 151.

Referring to the third drawing of FIG. 6A, the execution screen (610) of a camera application may be converted into an execution screen (630) of a photo album application, according to the user input as described in the second drawing of FIG. 6A.

Thereafter, a user may apply a tapping input to a right side (600) of the bezel portion which encloses the display unit 151. Specifically, a user may tap twice on the right side (600) of the bezel portion.

In a further embodiment, a user may apply a flicking input (640) to the left side to an execution screen (630) of a photo album application.

In a further embodiment, a user may take a gesture that seems to turn over a screen 151 to the left with the palm of his or her hand opened without touching the screen 151.

Referring to the fourth drawing of FIG. 6A, the execution screen (630) of a photo album application may be converted into an execution screen (650) of a messenger application, according to the user input of the third drawing of FIG. 6A.

In an embodiment, the execution screen (630) of a photo album application may be moved to the left following a user's finger applying a flicking input (640). As a result, the execution screen (650) of a messenger application may be output following a user's finger in a form that seems to push out the execution screen (630) of a photo album application.

In a further embodiment, the execution screen (650) of a messenger application may be output in a form that seems to push out the execution screen (630) of a photo album application, following a user's hand motion that seems to turn over a screen 151 to the left without touching the screen 151.

Thus, an execution screen of an application which is preset as an application related to a specific application may be output, according to a user input applied during execution of a specific application.

That is, as described above, when a user applies a tapping input to a left or right (600) of the bezel portion or take a gesture that seems to turn over a screen to the left or right, an execution screen of an application which is preset as an application related to a specific application may be output.

In an embodiment, applications related to a specific application may be preset by a user. Specifically, a user may set a photo album application and a messenger application as an application related to a camera application.

In a further embodiment, the controller 180 may calculate applications related to a specific application on the basis of a specific reference and output one execution screen among the applications calculated by a user input.

Specifically, the controller 180 may calculate applications which have been frequently executed together with a specific application and output one execution screen among the applications calculated by a user input.

Alternatively, the controller 180 may calculate an application related to a specific application on the basis of a type of data or a module accessed or used when the specific application is executed.

Specifically, when the same data is accessed or the same module is used when each of the first application and the second application is executed, the first application and the second application may be calculated as applications related to each other.

In a further embodiment, referring to the first drawing of FIG. 6B, a user may apply a pinch out input (660) to an execution screen (650) of a messenger application which has been output as a related application in the fourth drawing of FIG. 6A.

Referring to the second drawing of FIG. 6B, a mode setting screen (670) which can select a mode may be output according to the user's pinch out input (660). Specifically, icons (672 and 673) corresponding to the modes which have previously been created may be output to the mode setting screen (670).

Consecutively, a user may touch and select the mode setting icon (676) which has been output to the mode setting screen (670).

Referring to the third drawing of FIG. 6B, as the mode setting icon (676) is selected, a new mode which includes the related applications as executable applications may be created.

Specifically, a new mode, which includes related applications as described with reference to FIG. 6A such as a camera application, a photo album application and a messenger application as executable applications, may be created.

In an embodiment, thumbnail images (612, 632 and 652) corresponding to execution screens of a camera application, a photo album application and a messenger application, respectively, which are executable in the new mode may be output. In this case, a user may confirm the thumbnail images (612, 632 and 652) by applying a flicking input to the left (690) or right direction.

Further, an icon (680) indicating that a new mode has been created may be output to the screen 151, and a user may touch and select the icon (680).

Referring to the fourth drawing of FIG. 6B, as the icon (680) indicating that a new mode has been created is selected, a mode setting screen (682) for editing the new mode may be output.

Specifically, a mode name input window (684) through which a name of a new mode can be input may be output, and a user may input a name of the new mode after touching and selecting the mode name input window (684). In this case, a camera application, a photo album application and a messenger application (686) may be recorded in the list of applications which are executable in the new mode.

Meanwhile, the controller 180 may control the display unit 151 such that the first screen information may be converted into the fifth screen information corresponding to the fifth application which has been executed for a time that has been set before or after execution of the first application, in response to a control command for an application conversion which is input in the first mode.

FIG. 7A through 7D are schematic views illustrating embodiments of a user interface which is converted into an application that has recently been executed.

Figure 7A:
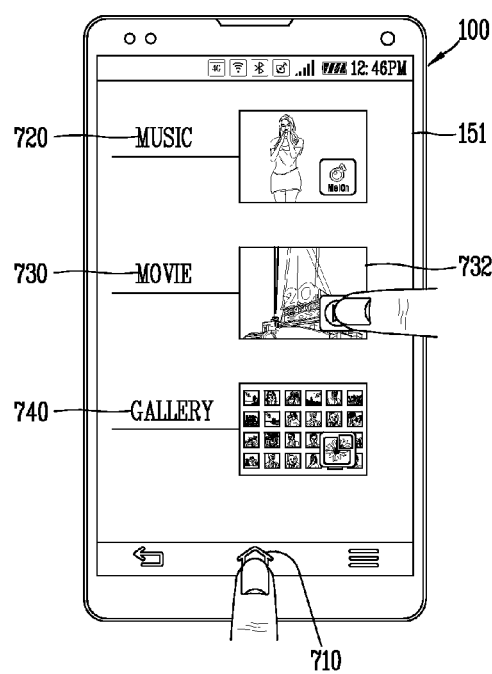
FIG. 7A through 7D are schematic views illustrating examples of a user interface to convert a current application into an application that has recently been executed.

Referring to FIG. 7A, when a user presses a home button 710 long or short, lists (720, 730 and 740) of applications which have recently been executed may be output.

Specifically, thumb nail images corresponding to a title of an application, an icon of an application and an execution screen of an application may be output. In this case, the lists (720, 730 and 740) of the applications may be output from the lower side to the upper side of the screen 151 in the order of the recently executed applications. Further, a user may search the lists (720, 730 and 740) of the recently executed applications by applying a flicking input in the upper or lower direction.

Consecutively, a user may touch and select a thumb nail image (732) with respect to one application among the recently executed applications.

Figure 7B:
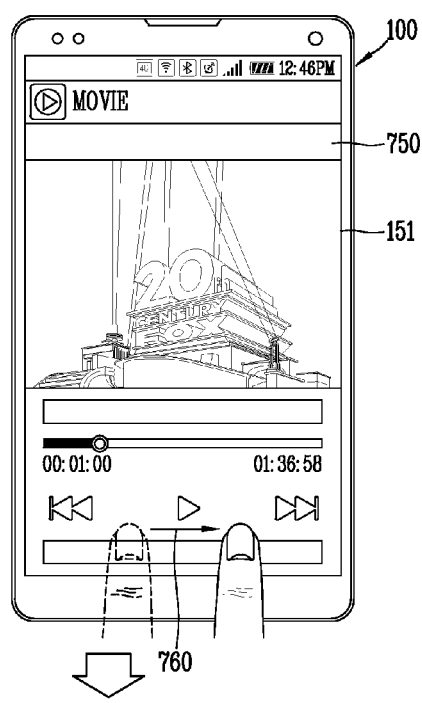

Referring to FIG. 7B, an execution screen (750) of a movie application corresponding to the selected thumbnail image (732) may be output. Thereafter, a user may apply a flicking input (760) in the right direction to the execution screen (750) of the movie application.

In a further embodiment, a user may apply a hand motion that seems to turn over a screen 151 to the left without touching the screen 151, or apply a tapping input to the left side of the bezel portion.

Figure 7D:
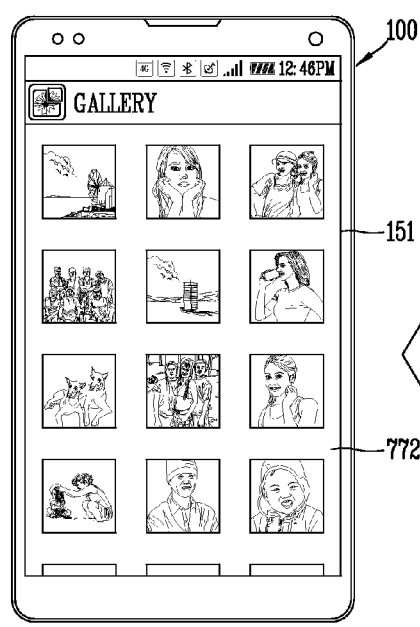
Figure 7C:
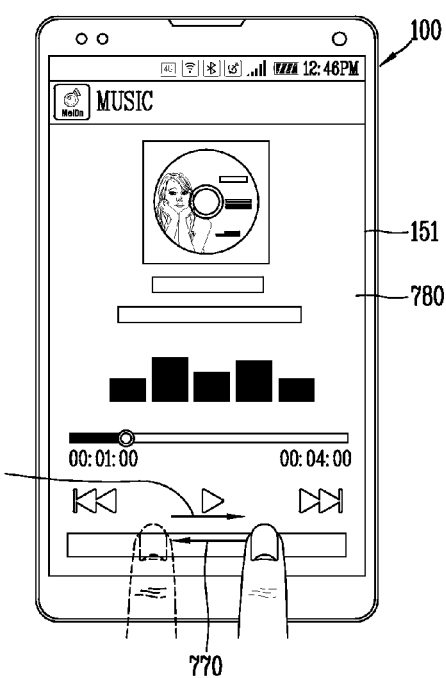

Referring to FIGS. 7C and D, an execution screen (780) of a music application which has been executed right before execution of the movie application may be output, according to the user input in FIG. 7B.

In an embodiment, an execution screen (780) of a music application may be output while pushing out an execution screen (750) of the movie application, according to a flicking input (760) applied to the right to the execution screen (780) of the movie application. That is, the execution screen (780) of the music application may be output, while turning over the page of the screen 151.

In a manner as described above, a user may apply a flicking input (780) to the right to the execution screen (780) of the music application.

In a further embodiment, a user may apply a hand motion that seems to turn over a screen 151 to the left without touching the screen 151, or apply a tapping input to the left of the bezel portion.

Thus, an execution screen of an application which has been executed right before execution of the music application may be output.

In an embodiment, an execution screen of an application which has been executed right before execution of a music application may be output while pushing out an execution screen (780) of the music application to the right, according to a flicking input (790) applied to the right to the execution screen (780) of the music application. That is, an execution screen of a new application may be output, while turning over the page of the screen 151.

In a further embodiment, a user may apply flicking inputs (770) twice to the left to the execution screen (780) of the music application. Alternatively, a user may apply a hand motion that seems to turn over a screen 151 to the left without touching the screen 151, or apply tapping inputs to a right side of the bezel portion several times.

Specifically, when a user applies a flicking input (770) to the left to the execution screen (780) of the music application one time, an execution screen (750) of the movie application may be output while pushing out the execution screen (780) of the music application to the left, following the user's finger (refer to FIG. 7B).

Consecutively, when a user applies again a flicking input to the left one time to the execution screen (750) of the movie application, an execution screen (772) of a photo album application may be output while pushing out the execution screen (750) of the movie application to the left, following the user's finger (refer to FIG. 7D).

Alternatively, when a user applies a hand motion to turn over the screen 151 to the left to the execution screen (780) of the music application one time, the execution screen (750) of the movie application may be output while pushing out the execution screen (780) of the music application to the left, following the user's hand motion (refer to FIG. 7B).

Consecutively, when a user applies again a hand motion to turn over the screen 151 to the left one time to the execution screen (750) of the movie application, an execution screen (772) of a photo album application may be output while pushing out the execution screen (750) of the movie application to the left, following the user's hand motion (refer to FIG. 7D).

Alternatively, when a user taps on a left or right side of the bezel portion during execution of the music application, the execution screen (750) of the movie application may be output while pushing out the execution screen (780) of the music application to the left (refer to FIG. 7B).

Consecutively, when a user taps again on a left or right side of the bezel portion, an execution screen (772) of a photo album application may be output while pushing out the execution screen (750) of the movie application to the left (refer to FIG. 7D).

That is, according to FIG. 7A through 7D, conversion among the applications which have recently been executed may be promptly performed according to a user input.

According to a specific embodiment, when a flicking input in a right direction is consecutively applied, applications which have been executed before the currently-executed application may be output in order. Alternatively, when flicking inputs in a left direction are consecutively applied, applications which will be executed after the currently-executed application may be sequentially output.

FIG. 7A through 7D do not illustrate a user's direct setting of a mode. However, referring to FIG. 7A through 7D, it can be regarded that the mobile terminal has entered a mode in which conversion among applications which have recently been executed is possible, according to a user input to select one of recently executed applications from a list of the applications which has been output.

Meanwhile, the controller 180 may control the display unit 151 to convert the first screen information into the fifth screen information corresponding to the fifth application in a case where a first icon for executing the first application and a fifth icon for executing the fifth application are output in the same group, in response to a control command for an application conversion which is input in the first mode.

FIG. 8A through 8D are schematic views illustrating embodiments of a user interface to perform conversion among applications which exist in the same group.

Figure 8A:
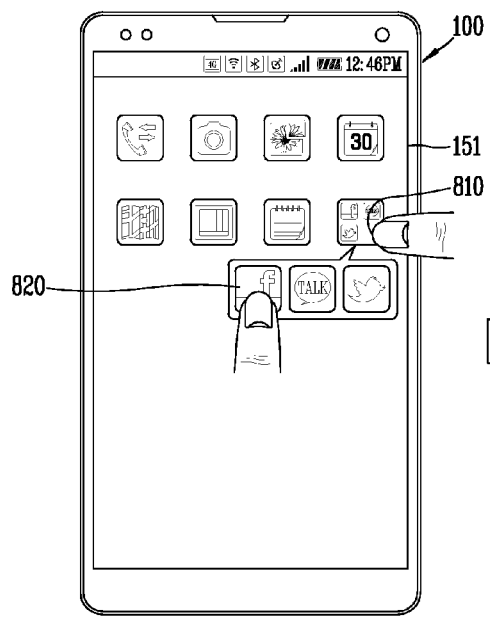
FIG. 8A through 8D are schematic views illustrating examples of a user interface to convert a current application into an application that exists in the same group.

Referring to FIG. 8A, when an icon (810) corresponding to a group including a plurality of applications is touched and selected, a plurality of icons corresponding to applications included in the relevant group may be output. In this case, a user may touch and select one (820) of the plurality of icons.

Figure 8B:
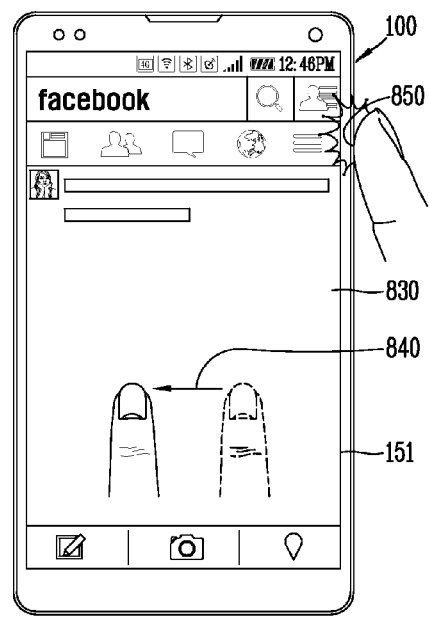

Referring to FIG. 8B, an execution screen (830) of a first application which corresponds to the selected icon (820) may be output. Thereafter, a user may apply a flicking input (840) to the left to the execution screen (830) of the first application, or apply an input to tap on a right side (850) of the bezel portion.

Figure 8D:
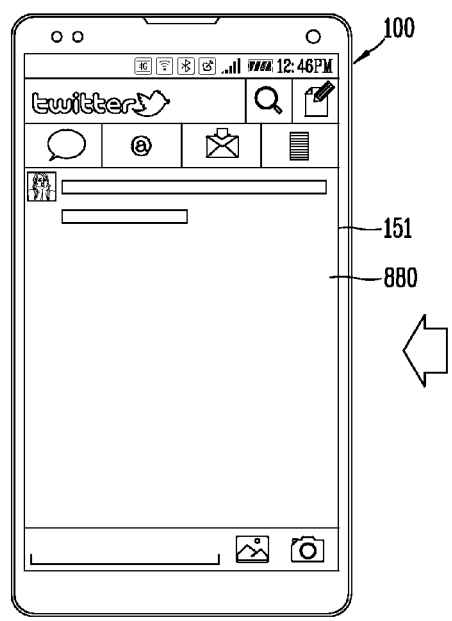
Figure 8C:
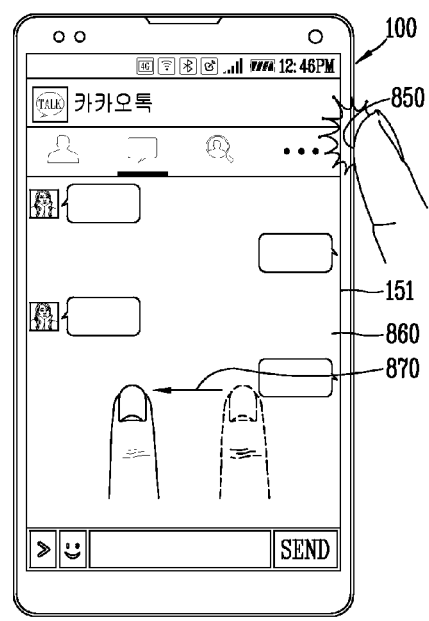

Referring to FIG. 8C, an execution screen (860) of the second application which is included in the corresponding group may be output while pushing out the execution screen (830) of the first application to the left, according to the user input of FIG. 8B. Specifically, the execution screen (830) of the first application may be pushed out to the left according to the user's flicking input (840).

Consecutively, a user may apply a flicking input (870) to the left to the execution screen (860) of the second application, or apply an input to tap on the right side (850) of the bezel portion.

Referring to FIG. 8D, an execution screen (890) of the third application which is included in the corresponding group may be output while pushing out the execution screen (860) of the second application to the left, according to the user input of FIG. 8C. Specifically, the execution screen (860) of the second application may be pushed out to the left according to the user's flicking input (870).

That is, according to FIG. 8A through 8D, conversion among the applications which exist in the same group (folder) may be promptly performed according to a user input.

FIG. 8A through 8D do not illustrate a user's direct setting of a mode. However, referring to FIG. 8A through 8D, it can be regarded that the mobile terminal has entered a mode in which conversion among applications in the same folder is possible, according to a user input to select one of the applications in the same folder.

Meanwhile, the user input unit 123 is configured to receive an input of at least one among a control command to delete one of at least one mode which has been set, a control command to add a new mode, a control command to delete one of at least one application which has been set to be executable by at least one mode, and a control command to add a new application.

FIGS. 9A through 9D are schematic views illustrating an example of a user interface related to a mode edition.

Figure 9A:
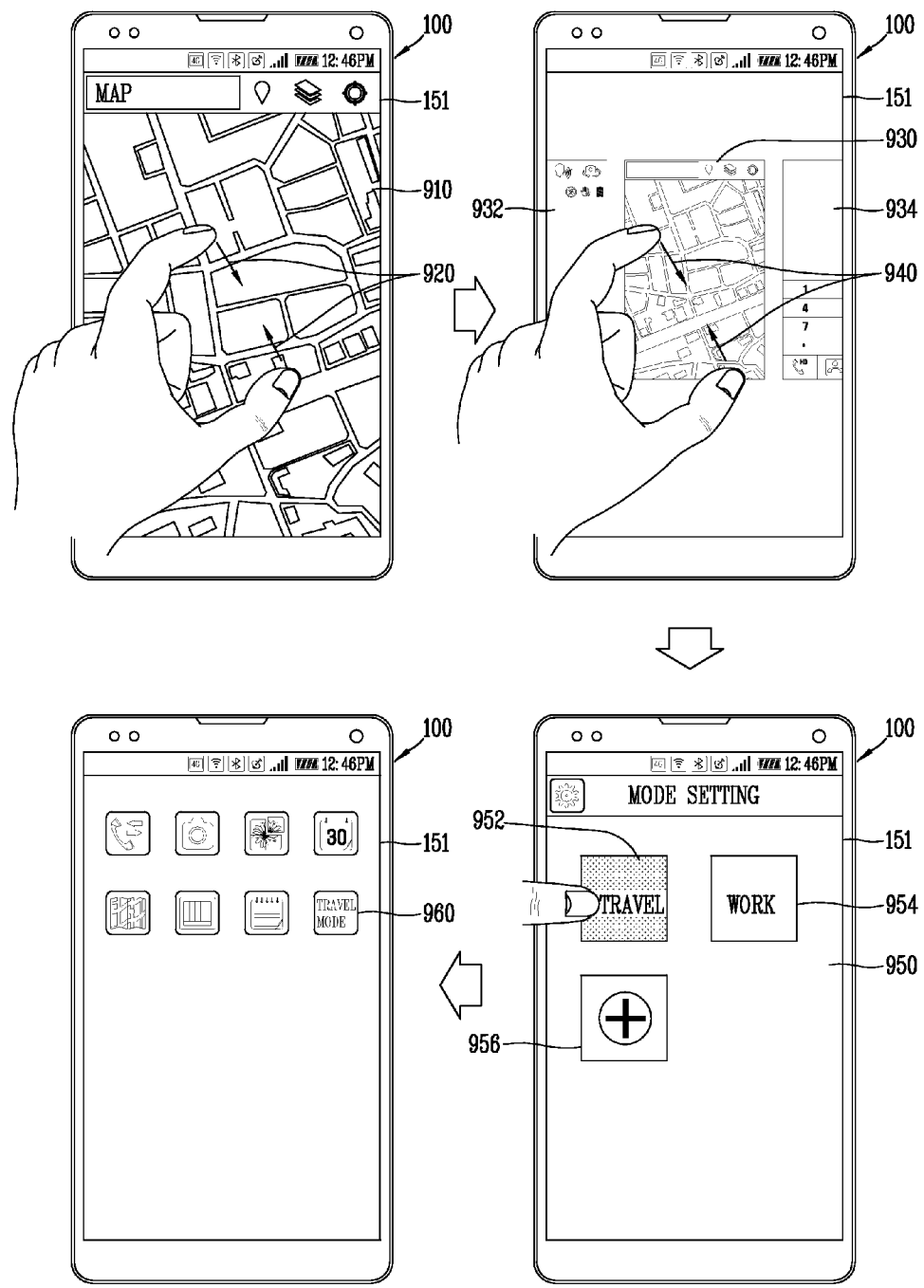
FIGS. 9A through 9C are schematic views illustrating examples of a user interface which is related to a mode edition.

In an embodiment, it is assumed in FIG. 9A that the mobile terminal 100 is in a travel mode in which a map application, a camera application and a phone application are executable.

Referring to the first drawing of FIG. 9A, a user may apply a pinch-in input to an execution screen (920) of a map application.

Referring to the second drawing of FIG. 9A, a thumb nail (930) of a map application and thumb nails (932 and 934) of a camera application and phone application which are executable in the travel mode may be output, according to a user's pinch-in input (920). Further, a user may confirm the thumb nails (932 and 934) of the applications by applying a flicking input in the left or right direction.

Consecutively, a user may apply again a pinch-in input (940) to the screen on which the thumb nails (930, 932 and 934) are output.

Referring to the third drawing of FIG. 9A, according to the user's pinch-in input (940), a mode setting screen (950) may be output. On the mode setting screen (950), icons (952 and 954) corresponding to the modes which have been set may be output. Further, an icon (956) corresponding to a control command for a new mode creation may be output.

In an embodiment, a user may long-touch an icon (952) corresponding to a travel mode which has previously been set.

Referring to the fourth drawing of FIG. 9A, according to a user input to long-touch the icon (952) corresponding to a travel mode, a travel mode may be registered as a frequent-used mode of the mobile terminal 100.

Thus, an icon (960) to convert a mode of the mobile terminal 100 into a travel mode may be output to the home screen 151. Specifically, when a user touches the icon (960), a mode of the mobile terminal 100 may be set as a travel mode.

Figure 9B:
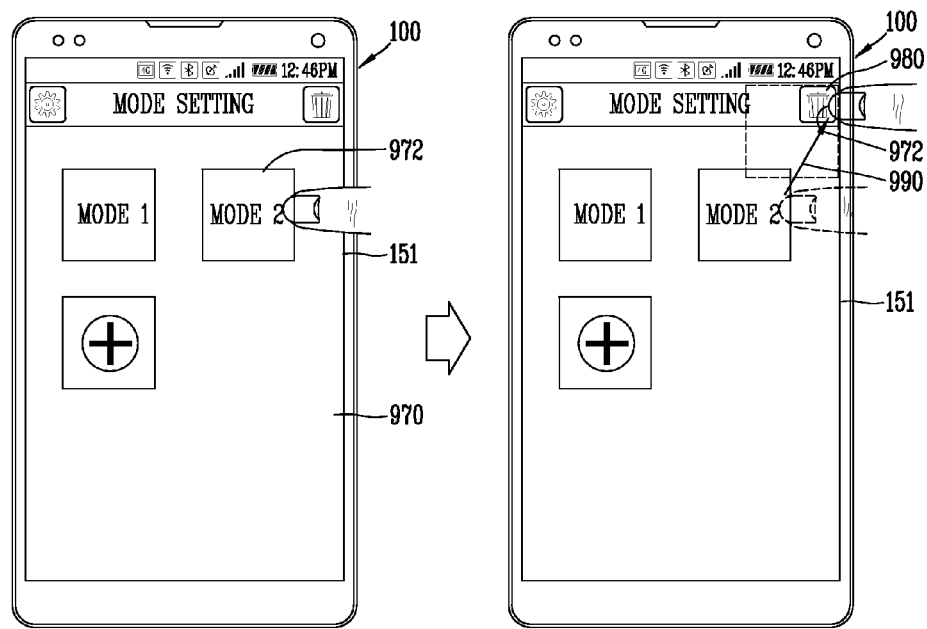

In a further embodiment, referring to FIG. 9B, a user may long-touch an icon (972) corresponding to a second mode which is output to a mode setting screen (970).

As a result, a mode deletion icon (980) is output, and a user may apply an input to drag the icon (972) corresponding to the second mode toward the mode deletion icon (980).

According to such a user drag input (990), the icon (972) corresponding to the selected second mode may disappear. That is, the second mode may be deleted.

Figure 9C:
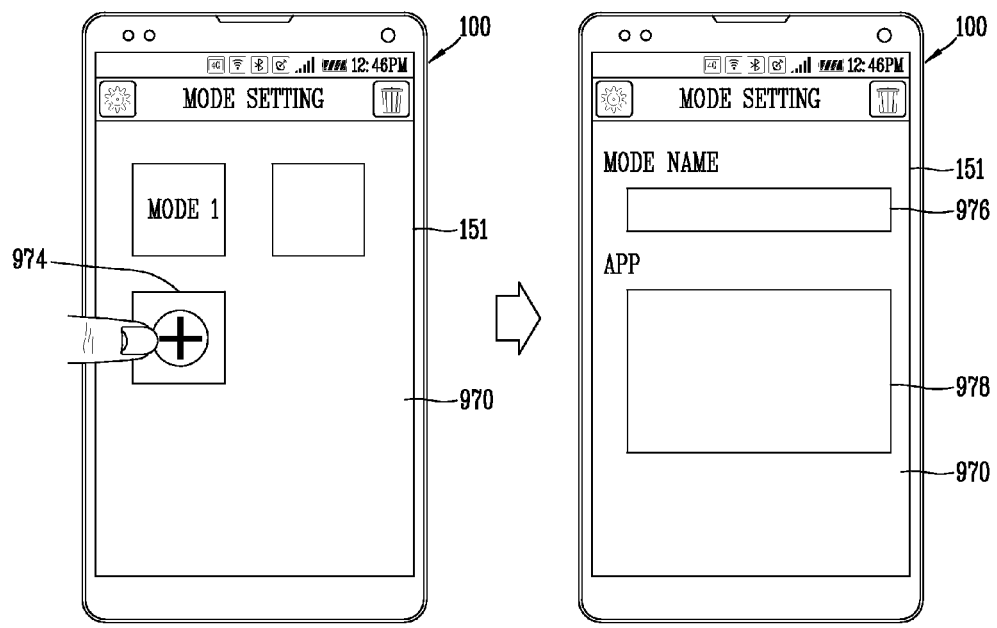

Referring to FIG. 9C, a user may touch and select a mode creation icon (974) which is output to the mode setting screen (970).

Thus, it is possible to provide a user interface to set a new mode. Specifically, an input window (976) through which a name of a mode may be input and an input window (978) through which an application which may be executable in the new mode may be output.

Figure 10A:
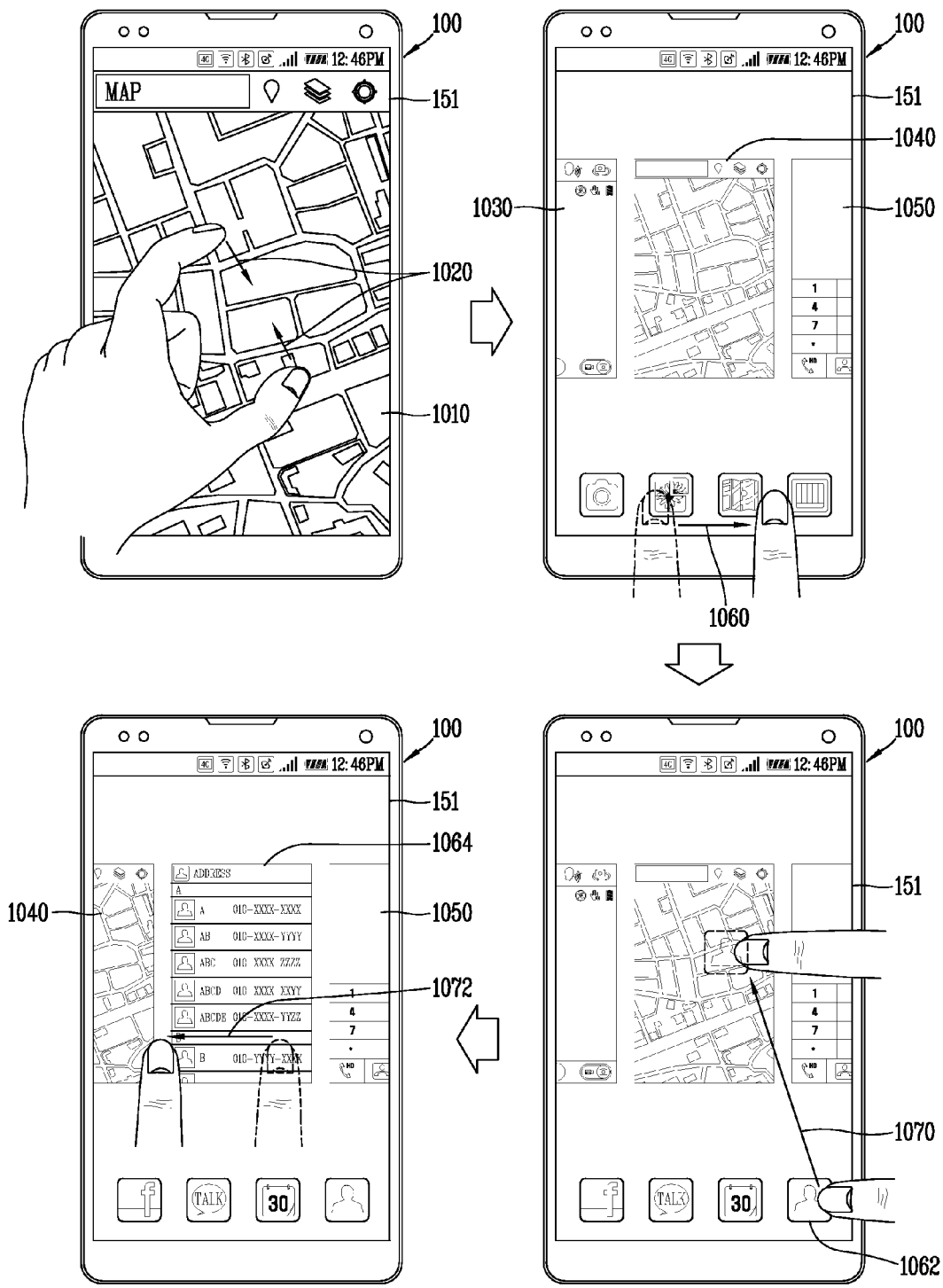
FIGS. 10A through 10C are schematic views illustrating examples of a user interface which is related to an application edition.
Figure 10B:
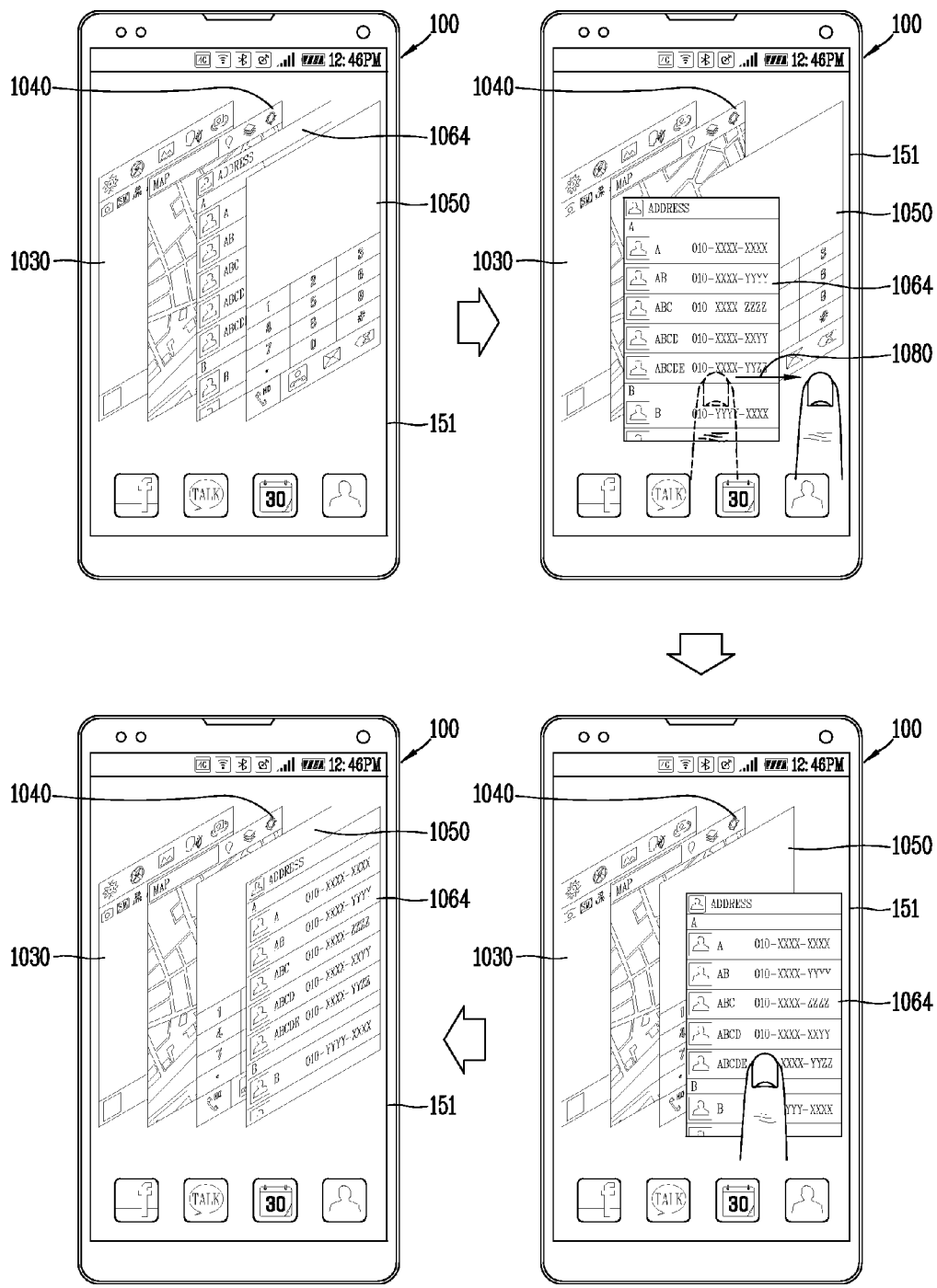
Figure 10C:
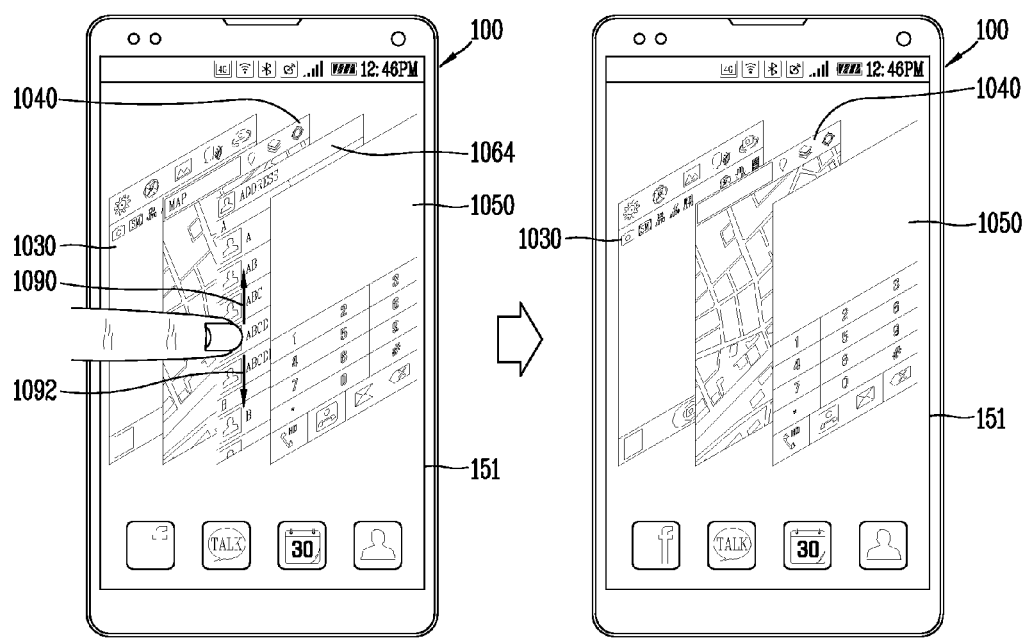

FIGS. 10A through 10C are schematic views illustrating embodiments of a user interface related to an application edition.

Referring to the first drawing of FIG. 10A, a pinch-in input (1020) may be applied to an execution screen (1010) of a map application in a travel mode.

Referring to the second drawing of FIG. 10A, according to the user's pinch-in input (1020), thumb nails (1030, 1040 and 1050) corresponding to execution screens of the camera application, map application and phone application, respectively, which are executable in the travel mode may be output.

Further, icons corresponding to applications, respectively, which may be added as executable applications in the travel mode may be output at a lower side of the screen 151. In this case, a user may search the icons by applying a flicking input (1060) in the left or right direction.

Referring to the third drawing of FIG. 10A, a user may move an icon (1062) corresponding to contact information application which is one of icons being output to a lower side of the screen 151, toward a direction where the thumb nails (1030, 1040 and 1050) are output by dragging (1070) the icon (1062).

Referring to the fourth drawing of FIG. 10A, according to the user's drag input (1070), a thumb nail (1064) corresponding to an execution screen of the contact information application is output and the contact information application may be set as an application which is executable in the travel mode.

Further, a user may search thumb nails (1030, 1040, 1050 and 1064) corresponding to applications which are executable in the travel mode by applying a flicking input (1072) in a left or right direction.

In a further embodiment, referring to the first drawing of FIG. 10B, thumb nails (1030, 1040, 1064 and 1050) corresponding to execution screens of the camera application, map application, contact information application and phone application which are executable in the travel mode, respectively, may be arranged in order.

In this case, a user may apply a long-touch input to select the thumb nail (1064) of the contact information application.

Referring to the second drawing of FIG. 10B, when a user long-touches and select the thumb nail (1064) of the contact information application, the selected thumb nail (1064) is out of the state that arranged in order and output as an image which seems to be laid on the remaining thumb nails (1030, 1040 and 1050).

Consecutively, a user may apply a drag input (1080) toward the right side of the thumb nail (1050) of a phone application so that the selected thumb nail (1064) may be arranged in the next order of the thumb nail (1064) of a phone application.

Referring to the third drawing of FIG. 10B, according to the user's drag input (1080), the selected thumb nail (1064) may be output to the right side of the thumb nail (1050) of a phone application.

Specifically, the thumb nail (1050) of a phone application may be pushed out to the left according to a movement of the selected thumb nail (1064). As a result, the thumb nails (1030, 1040 and 1050) of the camera application, map application and phone application may be arranged in order.

Further, the thumb nail (1064) of a contact information application may be output as an image that seems to be laid on the remaining thumb nails (1030, 1040 and 1050) at the most right side.

Referring to the fourth drawing of FIG. 10B, when a user separates a finger which is in touch with the thumb nail (1064) as in the third drawing of FIG. 10B, thumb nails (1030, 1040, 1050 and 1064) corresponding to execution screens of the camera application, map application, phone application and contact information application, respectively, which are executable in the travel mode may be arranged in order.

According to the embodiment as described in FIG. 10B, a user may change the order of the arrangement of the thumb nails by moving the thumb nails of the applications. Thus, it is possible to change the order of an application which is executable in a specific mode.

Specifically, according to the first drawing of FIG. 10B, when a plurality of flicking inputs are applied to the right during execution of a camera application in the travel mode, execution screens corresponding to the map application, contact information application and camera application, respectively, may be output in order.

In contrast, according to the fourth drawing of FIG. 10B, when a plurality of flicking inputs are applied to the right during execution of a camera application in the travel mode, execution screens corresponding to the map application, phone application and camera application, respectively, may be output in order.

In a further embodiment, referring to FIG. 10 C, thumb nails (1030, 1040, 1064 and 1050) corresponding to execution screens of the camera application, map application, contact information application and phone application, respectively, which are executable in the travel mode may be arranged in order.

In this case, a user may apply drag inputs (1090 and 1092) to the thumb nail (1064) of the contact information application in an upper or lower direction.

As a result, the thumb nail (1064) of the contact information application may disappear from the screen 151. That is, thumb nails (1030, 1040, 1064 and 1050) corresponding to execution screens of the camera application, map application, contact information application and phone application, respectively, may be arranged in order, and the contact information application is excluded from the applications which are executable in the travel mode.

The effect of the mobile terminal and control method of the same according to the present invention is as follows.

According to at least one of the embodiments of the present invention, there is an advantage in that it is possible to convert a mode and application without executing a number of screen conversions.

Further, according to least one of the embodiments of the present invention, conversion among applications frequently executed together or recently executed applications may be performed without executing a number of screen conversions.

In another aspect of the invention, conversion among the applications which exist in the same folder may be performed without executing a number of screen conversions.

As a result, it is possible to enhance a user's convenience.

As described above, the present invention is capable of implementing a computer readable code in a media in which programs are recorded. The computer readable media include all kinds of recording devices in which data readable by a computer system are stored. Examples of the computer readable media are a Hard Disk Drive (HDD), a Solid State Disk (SSD), a Silicon Disk Drive (SSD), a ROM, a RAM, a CD-ROM, a magnetic tape, a floppy disk, an optical data storage device, and include a type in the form of a carrier wave (for instance, transmission via internet). Further, the controller 180 of the computer terminal may be included.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless Alternatively specified, but rather should be considered broadly within its scope as defined in the appended claims, and therefore all changes and modifications that fall within the metes and bounds of the claims, or equivalents of such metes and bounds are therefore intended to be embraced by the appended claims.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal, comprising:
a user input unit configured to receive a setting of one of a plurality of modes and to receive a setting of one of a plurality of applications;
a display configured to display first screen information, second screen information, third screen information and fourth screen information, the first screen information corresponding to a first application that is executable while in a first mode; and
a controller configured to control the display such that the first screen information is converted to the second screen information, in response to an application conversion control command that is input while in the first mode, the second screen information corresponding to a second application that is executable while in the first mode,
wherein the controller controls the display to convert screen information corresponding to the first mode to screen information corresponding to a second mode, and the controller controls the display to convert the first mode to the second mode, in response to a mode conversion control command that is input while in the first mode, wherein the screen information corresponding to the second mode is an execution screen of an application that is selected based on a preset reference among a plurality of applications executable in the second mode, and
wherein the controller controls the display to convert the third screen information to the fourth screen information, in response to an application conversion control command that is input while in the converted second mode, the third screen information corresponding to a third application that is executable while in the second mode, and the fourth screen information corresponding to a fourth application that is executable while in the second mode,
wherein in response to a different application conversion control command that is input while in the first mode, the controller controls the display to convert the first screen information to fifth screen information, the fifth screen information corresponding to a fifth application that is preset as an application related to the first application, and
wherein the same data is accessed or the same module is used when each of the first application and the fifth application is executed,
wherein the controller controls the display to:
display a group icon corresponding to a group including a plurality of applications,
display a plurality of icons corresponding to the applications included in the group based on a preset touch input applied to the group icon,
display an execution screen of an application that corresponds to a selected icon from among the plurality of icons, and
convert an execution screen of a different application included in the group based on an applied preset touch input,
wherein the plurality of modes include a third mode and a fourth mode, and
wherein the third mode includes applications that are frequently used together, and
the fourth mode includes applications that have been continuously used for a predetermined period of time.

2. The mobile terminal of claim 1, wherein the application conversion control command that is input while in the first mode corresponds to at least one of a user's gesture to change a screen to a left direction or a right direction, and a touch input at a left side or a right side of a bezel of the display.

3. The mobile terminal of claim 2, wherein the user's gesture includes a left direction flicking input or a right direction flicking input at the display.

4. The mobile terminal of claim 1, wherein the mode conversion control command that is input while in the first mode corresponds to at least one of a user's gesture to change a screen in an upper direction or a lower direction, and a touch input at an upper end or a lower end of a bezel of the display.

5. The mobile terminal of claim 4, wherein the user's gesture includes an upper flicking input or a lower flicking input at the display.

6. The mobile terminal of claim 1, wherein, in response to an application conversion control command that is input while in the first mode, the controller controls the display to display an image effect, the displayed visual effect to represent that a current application is convertible into at least one application that is executable while in the first mode.

7. The mobile terminal of claim 1, wherein, in response to a mode conversion control command that is input while in the first mode, the controller controls the display to display an image effect, the displayed visual effect to represent that a current mode is convertible into one of the set modes.

8. The mobile terminal of claim 1, wherein, in response to an application conversion control command that is input while in the first mode, the controller controls the display to convert the first screen information to fifth screen information, the fifth screen information corresponding to a fifth application that has been executed for a preset time before or after execution of the first application.

9. The mobile terminal of claim 1, wherein, in response to an application conversion control command that is input while in the first mode, the controller controls the display to convert the first screen information to fifth screen information corresponding to a fifth application, when a first icon for executing the first application and another icon for executing the fifth application are displayed in a same group, in response to an application conversion control command that is input while in the first mode.

10. A method for controlling a mobile terminal having a display and a controller, comprising:
receiving a setting of one of a plurality of modes and one of a plurality of applications;
in response to an application conversion control command that is input while in the first mode, converting first screen information corresponding to a first application that is executable while in a first mode to second screen information corresponding to a second application that is executable while in the first mode;
in response to an application conversion control command that is input while in the first mode, converting screen information corresponding to the first mode to screen information corresponding to the second mode, and converting the first mode to the second mode, wherein the screen information corresponding to the second mode is an execution screen of an application that is selected based on a preset reference among a plurality of applications executable in the second mode; and
in response to an application conversion control command that is input while in the converted second mode, converting third screen information corresponding to a third application that is executable while in the second mode to fourth screen information corresponding to a fourth application that is executable in the second mode, wherein the converting of the first screen information to the second screen information includes receiving a different application conversion control command that is input while in the first mode, and controlling the display to convert the first screen information to fifth screen information corresponding to a fifth application that is preset as an application related to the first application, and wherein the same data is accessed or the same module is used when each of the first application and the fifth application is executed, wherein the controller controls the display to:
- display a group icon corresponding to a group including a plurality of applications,
- display a plurality of icons corresponding to the applications included in the group based on a preset touch input applied to the group icon,
- display an execution screen of an application that corresponds to a selected icon from among the plurality of icons, and
- convert an execution screen of a different application included in the group based on a preset touch input applied, wherein the plurality of modes include a third mode and a fourth mode, and wherein the third mode includes applications that are frequently used together, and the fourth mode includes applications that have been continuously used for a predetermined period of time.

11. The method of claim 10, wherein the application conversion control command that is input while in the first mode corresponds to at least one of a user's gesture to change a screen in a left direction or a right direction, and a user's touch input at a left side or a right side of a bezel of the display.

12. The method of claim 11, wherein the user's gesture includes a left flicking input or a right flicking input at the display.

13. The method of claim 10, wherein the mode conversion control command that is input while in the first mode corresponds to at least one of a user's gesture to change a screen in an upper direction or a lower direction, and a touch input at an upper end or a lower end of a bezel of the display.

14. The method of claim 13, wherein the user's gesture includes an upper flicking input or a lower flicking input at the display.

15. The method of claim 10, wherein the converting of the first screen information to the second screen information includes receiving an application conversion control command that is input while in the first mode, and controlling the display to display an image effect, the displayed visual effect to represent that a current application is convertible to at least one application that is executable while in the first mode.

16. The method of claim 10, wherein the converting of the first mode to the second mode includes receiving a mode conversion control command that is input while in the first mode, and controlling the display to display an image effect, the displayed visual effect to represent that a current mode is convertible to at least one set mode.

17. The method of claim 10, wherein the converting of the first screen information to the second screen information includes receiving an application conversion control command that is input while in the first mode, and controlling the display to convert the first screen information to fifth screen information corresponding to a fifth application that has been executed for a preset time before or after execution of the first application.

18. The method of claim 10, wherein the converting of the first screen information to the second screen information includes receiving an application conversion control command that is input while in the first mode, and controlling the display to convert the first screen information to fifth screen information corresponding to a fifth application, when a first icon for executing the first application and another icon for executing the fifth application are displayed in a same group.

* * * * *